United States Patent [19]

Suzuki et al.

[11] Patent Number: 5,416,596
[45] Date of Patent: May 16, 1995

[54] AN APPARATUS FOR TRANSMITTING, RECEIVING AND RECORDING AN IMAGE

[75] Inventors: Akio Suzuki; Hisashi Fukushima, both of Yokohama; Haruhiko Moriguchi, Yokohama; Yasushi Miura, Kawasaki; Toshimitsu Danzuka, Tokyo, all of Japan

[73] Assignee: Canon Kabushiki Kaisha, Tokyo, Japan

[21] Appl. No.: 782,385

[22] Filed: Oct. 24, 1991

[30] Foreign Application Priority Data

Oct. 24, 1990 [JP] Japan .................................. 2-287560
Oct. 29, 1990 [JP] Japan .................................. 2-288518
Dec. 6, 1990 [JP] Japan .................................. 2-400613

[51] Int. Cl.[6] .................. H04N 1/42; H04N 1/40; H04N 1/034
[52] U.S. Cl. ...................... 358/298; 358/436; 358/439; 347/3
[58] Field of Search ............... 358/296, 298, 429, 434, 358/435, 436, 439, 443, 448, 455, 456, 457, 463; 346/1.1, 75, 140 R, 76 PH; 347/3

[56] References Cited

U.S. PATENT DOCUMENTS

| | | | |
|---|---|---|---|
| 4,751,377 | 6/1988 | Ishizaka et al. | 250/205 |
| 4,786,976 | 11/1988 | Takao et al. | 358/298 X |
| 4,870,501 | 9/1989 | Yoshida | 358/284 |
| 5,073,966 | 12/1991 | Sato | 358/429 |
| 5,130,819 | 7/1992 | Ohta | 358/443 X |
| 5,153,749 | 10/1992 | Katayama | 358/448 |
| 5,187,592 | 2/1993 | Sugiyama et al. | 358/448 |
| 5,191,444 | 3/1993 | Harada et al. | 358/455 |
| 5,195,175 | 3/1993 | Kanno et al. | 358/474 |

FOREIGN PATENT DOCUMENTS

| | | | |
|---|---|---|---|
| 360401 | 3/1990 | European Pat. Off. | H04N 1/40 |
| 2633077 | 12/1989 | France | G06K 15/02 |
| 2285771 | 11/1990 | Japan | H04N 1/40 |
| 2221366 | 1/1990 | United Kingdom | H04N 1/40 |

Primary Examiner—Benjamin R. Fuller
Assistant Examiner—Eric Frahm
Attorney, Agent, or Firm—Fitzpatrick, Cella, Harper & Scinto

[57] ABSTRACT

An apparatus for transmission, reception and recording of an image, such as a facsimile apparatus, capable of correcting the unevenness in density or improper density resulting from fluctuation in the performance of the recording head of the receiving unit, with a limited amount of data transfer. At the start of communication, correction data for uneven or improper density of the recording head are sent from the receiving unit to the transmitting unit. The transmitting unit corrects the multi-value image data to be transmitted, based on the received correction data, and sends the corrected image data after conversion into binary state. The receiving unit receives the binary image data and effects image recording. The time and cost for data transmission can be reduced, as the correction is conducted at the transmitting unit and the data transmission can be made in binary data.

45 Claims, 17 Drawing Sheets

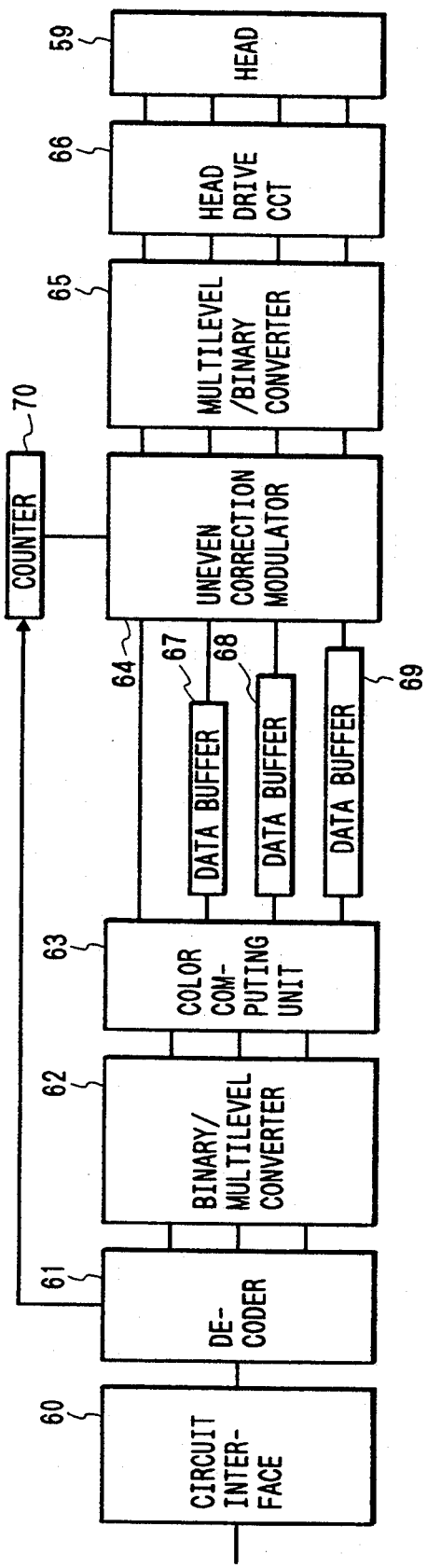
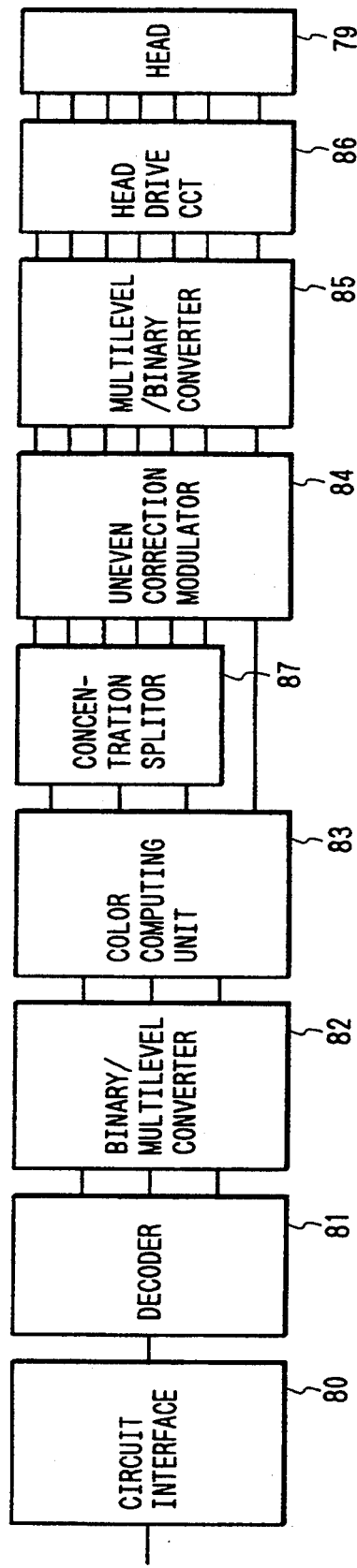

AN APPARATUS FOR TRANSMITTING, RECEIVING AND RECORDING AN IMAGE

BACKGROUND OF THE INVENTION

1. Field of the Invention

The present invention relates to an image transmission/reception/recording apparatus for transmitting and receiving image data, such as a facsimile apparatus, and also to an image transmission/reception/recording method.

2. Related Background Art

Recent progress in the image recording apparatus and communication technology has stimulated rapid popularization of image transmit/receiving apparatus for transmission and reception of an image, such as a facsimile apparatus, with continuously increasing requirements for higher image quality. Consequently there is longed for an apparatus capable of providing excellent tonal rendition and effecting high-speed communication. Based on such background, there are gradually becoming popular apparatus which, in the transmission, convert a multi-value signal into a binary signal for transmission by pseudo tonal rendition such as dither method or error diffusion method and, in the reception, record the received signal by processing in the binary state. In the image recording unit of the facsimile apparatus, digital image recording is generally employed with a recording head of thermal transfer type or ink jet type. In such recording, a multiple head in which plural image recording elements are integrated is generally employed for increasing the recording speed. For example, for the ink jet recording head, there is generally employed a multi nozzle head in which plural nozzles are integrated, and, in the thermal head for thermal transfer recording, plural heater elements are usually integrated.

FIG. 1 is a block diagram of a conventional facsimile apparatus employing such multiple head.

Facsimile apparatus A, B are composed of image reader units 21a, 21b, image processor units 22a, 22b for example for tone correction, binarizing units 23a, 23b for binary digitization of tone-corrected image signal; image recorder units 24a, 24b for image recording with binarized image signal, and interfaces 25a, 25b.

In the image transmission from the facsimile A to B, the image signal subjected to tonal correction in the image processor unit 22a and binary digitized in the binarizing unit 23a is supplied, through the interfaces 25a, 25b, to the image recorder unit 24b of the facsimile B and recorded therein.

In such multiple head, however, the image recording elements are difficult to prepare in uniform manner and inevitably involve certain fluctuation in the characteristics. For example, the multiple ink jet recording head involves fluctuation in the shape of nozzles, and the multiple thermal transfer recording head involves fluctuation in the shape or resistance of heater elements. The fluctuation in the characteristics among the image recording elements leads to uneven size or density of the dots recorded by the image recording elements, eventually resulting in an unevenness in the density of the recorded image. The quality of the received image has been significantly deteriorated by such unevenness. Particularly in color image communication, the deterioration of image quality is significant due to unevenness in color or error in color reproduction.

In order to overcome such drawback, there have been proposed various methods of obtaining a uniform image by correcting the signals given to the image recording elements. In one of such methods shown in FIGS. 2A to 2E, if a multiple head 1 with an array of recording elements 2 shown in FIG. 2A receives uniform input signals FIG. 2B and provides a density unevenness shown in FIG. 2C, the input signals are corrected as shown in FIG. 2D to a higher level for the recording elements giving a lower density and a lower level for the recording elements giving a higher density. In case of a recording method capable of modulating the dot diameter or dot density, the dot diameter to be recorded by each recording element may be modulated according to the input signal. For example, in the ink jet recording method of piezoelectric type, the driving voltage or the pulse duration for each piezoelectric element is varied according to the input signal, and, in the thermal transfer recording, the driving voltage or pulse duration to each heater element is likewise varied, whereby the dot diameters or densities of different recording elements are made uniform as shown in FIG. 2E. If the variation in the dot diameter or density is impossible or difficult, the number of dots is so regulated, according to the input signals, as to provide a larger number of dots in the recording elements providing a lower density and a smaller number of dots in the elements provide a higher density, thereby providing a uniform density as shown in FIG. 2E.

The amount of correction is determined in the following manner, as an example, in case of a multiple recording head with 256 nozzles.

Let us consider a case in which uniform image signals S provide a density distribution shown in FIG. 3. There are determined at first the average density OD for this head, then the densities $OD_1$–$OD_{256}$ corresponding to respective nozzles, and the differences $\Delta OD_n = OD - OD (n=1-256)$. If the tonal characteristic, namely the relationship between the image signal and the recorded density, is given by a chart shown in FIG. 4, a density correction by $\Delta OD_n$ requires a signal correction $\Delta S$. This can be achieved by a table conversion as shown in FIG. 5. In FIG. 5, a line A has an inclination of 1.0, whereby the input signal is released without any conversion. On the other hand, a line B has an inclination $(S-\Delta S)/S$, whereby an input S provides an output $S-\Delta S$.

Consequently a density OD can be obtained with the n-th nozzle by applying a table conversion as indicated by the line B in FIG. 5 to the image signal corresponding to said n-th nozzle. The unevenness in density can be corrected and a uniform image can be obtained by applying such process to all the nozzles. Stated differently, correction of unevenness in density is rendered possible by determining, in advance, the table conversions to be applied to the image signals, respectively corresponding to different nozzles.

FIG. 6 is a block diagram of a facsimile apparatus in which such unevenness correction is adopted. The facsimile apparatus A, B are provided with unevenness correcting ROM's 26a, 26b and correction data RAM's 27a, 27b, in addition to the aforementioned image reader units 21a, 21b, image processor units 22a, 22b for tonal correction etc., binarizing units 23a, 23b, image recorder units 24a, 24b and interfaces 25a, 25b. The unevenness correction ROM's 26a, 26b store plural conversion tables as shown in FIG. 5, and effect correction of unevenness by selecting suitable conversion tables according to signals from correction data RAM's 27a, 27b.

In case of image transmission from the facsimile apparatus A to B, the signal processed in the image processor unit 22a is sent to the unevenness correction ROM 26b of the facsimile B. Said ROM 26b stores a plurality of tables for correcting the density unevenness of the image recorder unit 24b of the facsimile B, and effects the unevenness correction on the input signal, according to a table selected by the correction data RAM 27b.

A received image free from unevenness can be obtained in this manner, but this method requires transmission and reception of multi-value image data since the table conversion is conducted in the unevenness correction ROM 26b. Since the image data contain a large amount of information, such transmission and reception of multi-value data require enormous time and cost.

This drawback becomes even more conspicuous in a color facsimile apparatus for transmitting a color image, since multi-value data corresponding to plural recording heads have to be transmitted.

In the foregoing there has been explained the fluctuation among the image recording elements in a recording head, but same applies to the fluctuation among different recording heads. It is difficult to produce such recording heads without any fluctuation in performance, and the recording operation with such heads without any correction will result in a fluctuation in the image density, because of the fluctuation in the head performance. Thus there will result a drawback that an image appears dark in a facsimile apparatus but light in another.

FIG. 7 shows a facsimile apparatus conceived capable of copying with such drawback.

Image signals read in image reader units 21a, 21b are subjected to image processing, such as logarithmic conversion, in image processor units 22a, 22b. Each of density corrector units 33a, 33b has a look-up table representing 41 straight lines of which inclination varies by 0.01 within a range from 0.8 to 1.2, and selects a line corresponding to the density obtained by the recording head of the image recorder unit. For example the line A in FIG. 5 is a standard line with an inclination 1.0, and the line B of smaller inclination is selected if the recording head provides a higher density. Thus, in response to the input signal S, there is obtained a corrected image signal $S-\Delta S$, which is reduced by a factor $(S-\Delta S)/S$.

In case of image transmission from the facsimile apparatus A to B, the output signal of the image processor unit 22a of the facsimile A is transmitted to the density corrector unit 33b of the facsimile B, whereby a density correction is conducted corresponding to the recording head thereof to provide an image of an appropriate density in the facsimile apparatus B.

Also in this conventional structure, however, transmission and reception of multi-value image data are indispensable because the correction by table conversion is conducted at the receiving side, involving significant time and cost for such transmission and reception of image data.

SUMMARY OF THE INVENTION

In consideration of the foregoing, an object of the present invention is to provide an image transmit/receive/recording apparatus enabling transmission and reception of a satisfactory image with a limited amount of information transmission, and a method adapted for use in such apparatus.

Another object of the present invention is to provide an image receive/recording apparatus capable of achieving high-speed communication and obtaining an image of high quality from the received image signal, and a method adapted for use in such apparatus.

Still another object of the present invention is to provide an image transmit/receive/recording apparatus capable of providing an image with an appropriate density and without unevenness in density through transmission of information of a limited amount, and a method adapted for use in such apparatus.

The above-mentioned objects can be attained, according to the present invention, by correcting image data of m ($>2$) values at the transmitting side based on the characteristic data of the recording head of the receiving side, then transmitting said image data in the state of n ($<m$) values to the receiving side, and receiving and recording said image data of n values at the receiving side by means of said recording head.

As the correction of image data is conducted at the transmitting side, the present invention enables transmission of a satisfactory image without unevenness in the density by means of a limited amount of data, thereby reducing the time required for transmission.

Also the above-mentioned objects can be attained, according to the present invention, by an image receive/recording apparatus comprising binary-multi-value conversion means for converting the received binary image signal into a multi-value image signal; modulator means for modulating the multi-value image signal released from said binary-multi-value conversion means, according to the characteristics of the recording device; and driver means for driving said recording device according to the image signal modulated by said modulator means.

The above-mentioned structure enables high-speed communication because the image signal transmission is conducted in the binary state, and also enables to obtain an image of high image quality, since the multi-value image signal, obtained from the binary image signal, is modulated according to the characteristic of the recording device.

BRIEF DESCRIPTION OF THE DRAWINGS

FIG. 20 is a block diagram of the tenth embodiment of the present invention;

FIG. 22 is a block diagram of the eleventh embodiment of the present invention.

DETAILED DESCRIPTION OF THE PREFERRED EMBODIMENTS

Now the present invention will be clarified in detail by embodiments thereof, shown in the attached drawings, in which the present invention is applied to a facsimile apparatus employing an ink jet recording head.

At first there will be given an explanation on a first embodiment, with reference to the attached drawings.

Figure 8:
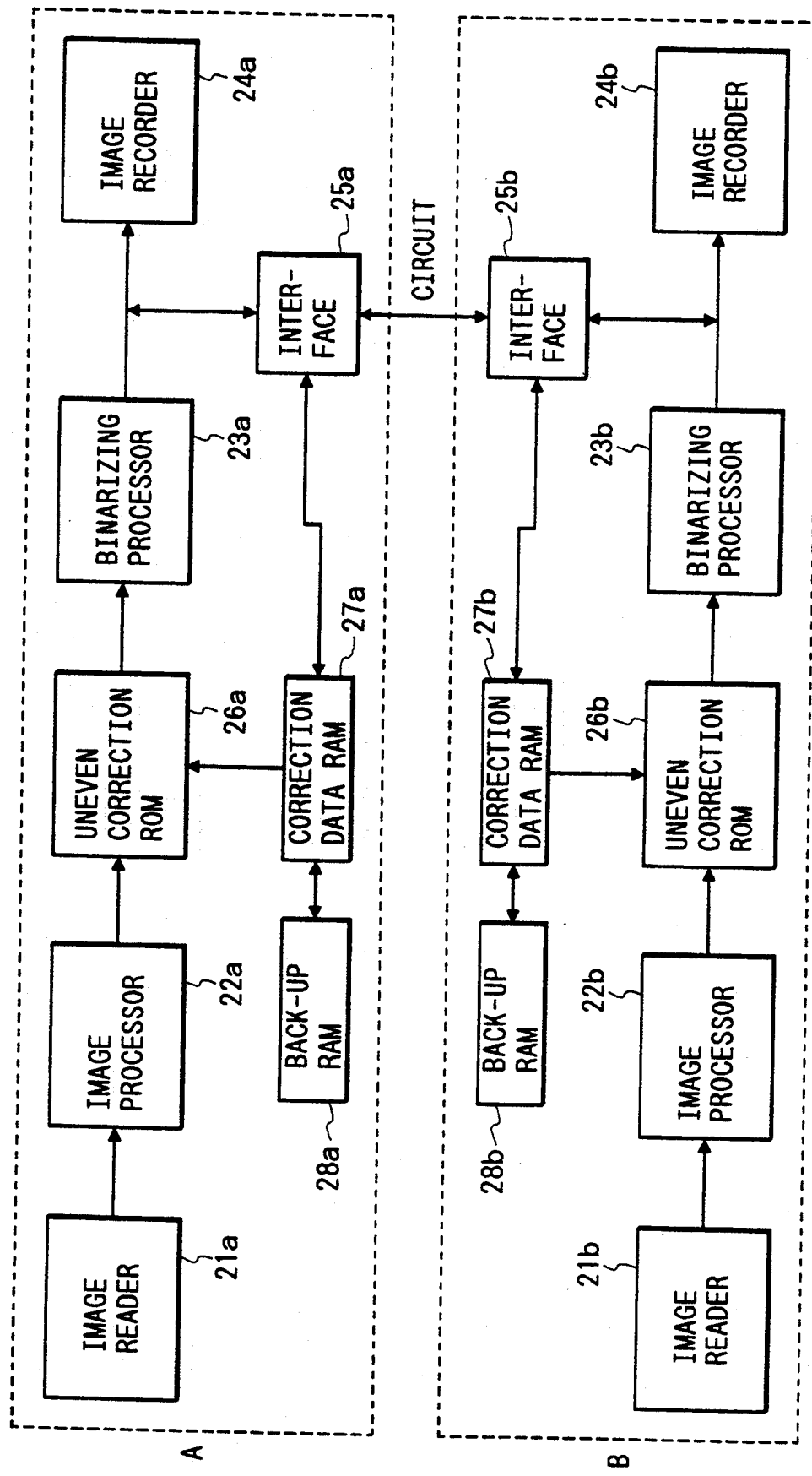
FIG. 8 is a block diagram of a first embodiment of the present invention.

Referring to FIG. 8, facsimile apparatus A, B are composed of image reader units 21a, 21b; image processor units 22a, 22b; unevenness correction ROM's 26a, 26b; unevenness correction data RAM's 27a, 27b; back-up RAM's 28a, 28b; binarizing units 23a, 23b; interfaces 25a, 25b' and image recorder units 24a, 24b.

Figure 9:
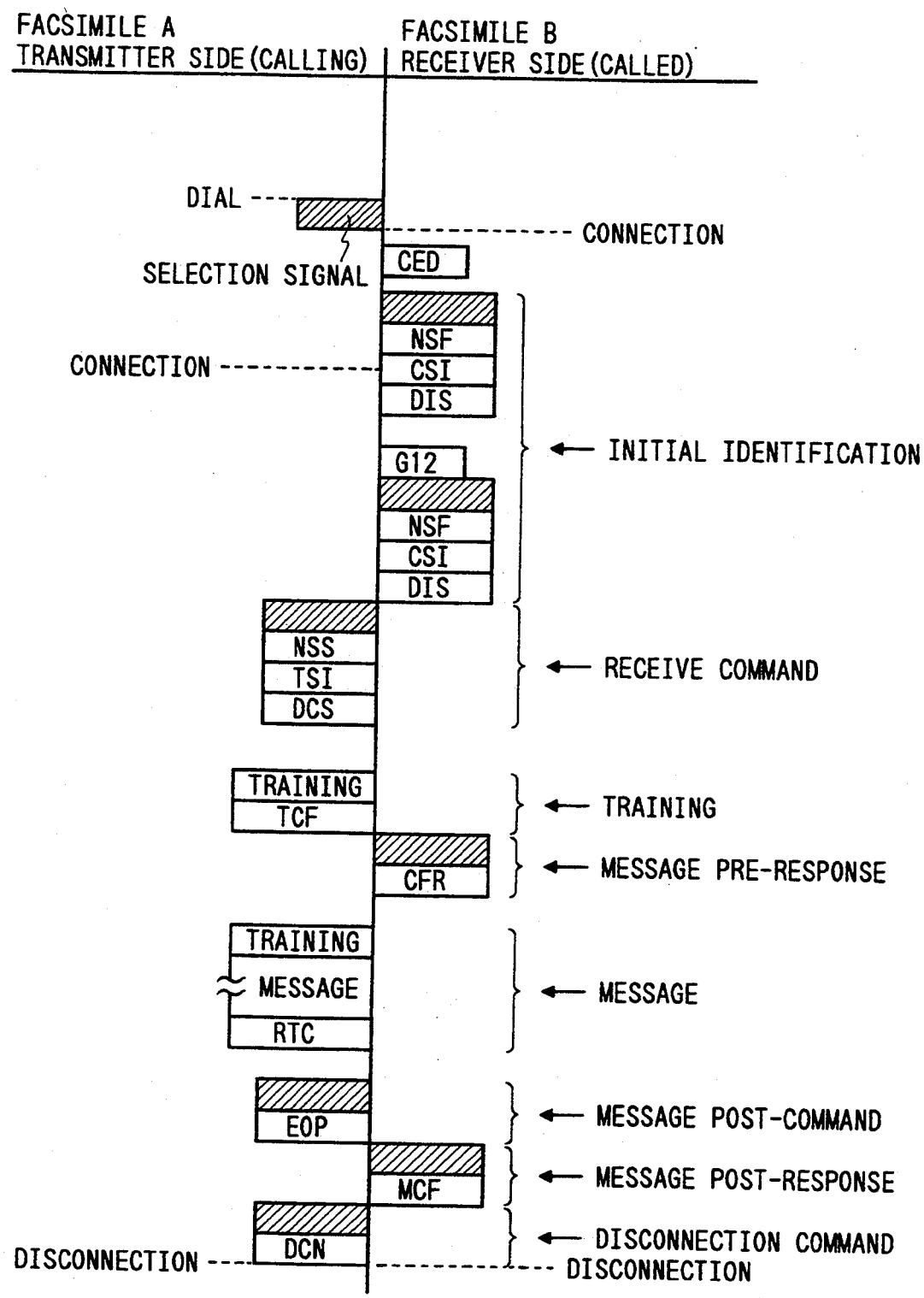
FIG. 9 is a view showing the control sequence for transmission.

The function of these facsimile apparatus will be explained, taking an example of image transmission from the facsimile apparatus A to B, with reference to FIG. 9 which shows the G3 facsimile control protocol.

When the facsimile apparatus A sends a transmission start signal (selection signal) to B, the facsimile A stores the unevenness correction data of its multiple head, stored in the correction data RAM 27A, into the back-up RAM 28a. Then the content of the correction data RAM 27b of the facsimile B is transferred through the interfaces 25b, 25a to the facsimile A, and stored in the correction data RAM 27a thereof. This data transmission is conducted by the facsimile information field FIF in the nonstandard functions NSF among the initial identification.

Subsequently the image reader unit 21a of the facsimile A reads the image, and the obtained image signal is processed in the image processor unit 22a and sent to the unevenness correction ROM 26a.

The unevenness correction ROM 26a stores a look-up table including 64 straight lines which are different inclination by 0.01 within a range of 0.68-1.31, and effects correction of unevenness by selecting a suitable inclination according to the signal from the correction data RAM 27a.

The correction data RAM 27a stores data for selecting one of the straight lines stored in the unevenness correction ROM 26a. In the present embodiment, the image recorder unit 24a is composed of a printer provided with a multi-nozzle ink jet recording head with 256 nozzles, so that the correction data are required for 256 nozzles. Data for a nozzle require 6 bits for selecting one of 64 correcting lines, so that there are required $6 \times 256 = 1536$ bits for 256 nozzles.

The correction data RAM 27a stores data, received from the facsimile B, for correcting the unevenness in density of the image recording head thereof, and selects one of the correcting lines in synchronization with the entry of image data into the unevenness correction ROM 26a. The image data after unevenness correction are binary digitized in the binarizing unit 23a, for example by the dither method or the error diffusion method.

The binary digitized image data are supplied, during a message period, through the interfaces 25a, 25b to the image recorder unit 24b of the facsimile B and recorded therein.

The image data sent to the facsimile B, being already subjected to correction of unevenness in the unevenness correction ROM 26a of the facsimile A according to the characteristic of the image recorder unit 24b of the facsimile B, can provide an image without unevenness in density.

For transmitting an A4-sized 8-bit image, for example with a density of 400 DPI, the conventional method needs to transmit and receive data of about $1.23 \times 10^8$ bits, since the image data are transmitted in the state of 256 values (8 bits) and subsequently subjected to the correction of unevenness. On the other hand, the present embodiment enables image transmission without unevenness in density through the transmission and reception of binary (1-bit) image data of about $1.55 \times 10^7$ bits and the unevenness correction data of 1536 bits, so that the time and the cost for data transmission can be significantly reduced.

The present embodiment has been explained with the G3 facsimile protocol, but the present invention is not limited to such protocol and can be realized with other protocols.

Figure 10:
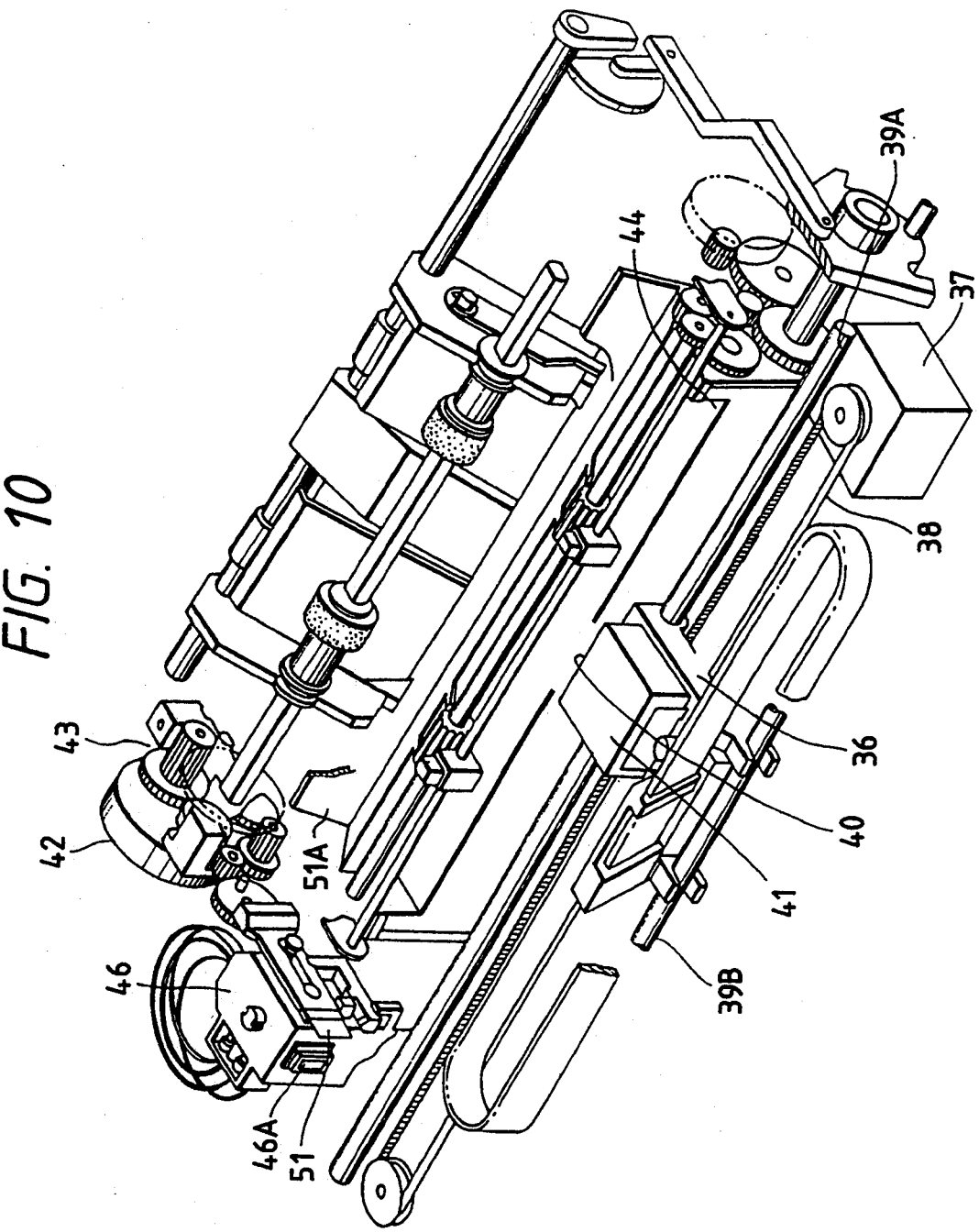
FIG. 10 is a perspective external view of the mechanism of the first embodiment of the present invention.

FIG. 10 is an external perspective view of the above-mentioned image recorder unit 24a or 24b.

In FIG. 10, an ink jet cartridge IJC 41 of detachable structure is constructed integrally with an ink jet recording head 40 of a method utilizing thermal energy and is provided with a tank for supplying said ink jet recording head with ink. Said ink jet cartridge 41 is detachably supported on a carriage HC to be explained later.

Said ink jet recording head 40, constituting a part of the ink jet cartridge 41, is provided with a group of nozzles positioned opposite to and effecting ink discharge to the recording face of a recording sheet, supplied onto a platen 44. Said carriage HC 36, supporting said recording head 40, is connected to a part of a driving belt 38 transmitting the driving force of a driving motor 37, and is rendered slidable along mutually parallel guide shafts 39A, 39B, thereby reciprocating the recording head 40 over the entire width of the recording sheet.

A head recovery unit 46 is positioned at an end of the moving path of the recording head 40, for example at a position opposite to the home position of said head, and is activated by a motor 42 through a transmission mechanism 43, thereby capping the recording head 40. In relation to said capping of the recording head 40 by a capping portion 46A of said head recovery unit 46, recovery of ink discharge, such as removal of viscosified ink in the discharge nozzles, is conducted by forced ink discharge (idle discharge) from said nozzles, either by ink absorption with suitable suction means (for example a suction pump) provided in the head recovery unit 46 or by ink pressurization by suitable pressurizing means provided in the ink supply path to the recording head 40. Also the capping at the end of a recording operation serves to protect the recording head.

A silicon rubber blade 51 constitutes a wiping member and is positioned at the side of the head recovery unit 46. Said blade 51 is supported, through a cantilever mechanism, by a blade support member 51A, and is actuated by the motor 42 and the transmission mechanism 43 in a similar manner as the head recovery unit 46, thereby becoming capable of engaging with the ink discharge face of the recording head 40. Thus said blade 51 protrudes into the moving path of the recording head 40, at a suitable timing in the course of the recording operation thereof or after the discharge recovery operation by the head recovery unit 46, thereby wiping off dew drops, liquid or dusts on said ink discharge face of the recording head 40 by the movement thereof.

In the following there will be explained a second embodiment of the present invention.

In contrast to the first embodiment applied to the monochromatic image, the second embodiment deals with a color image.

The basic circuit structure of said second embodiment is said as shown in FIG. 8, but the image reader units 21a, 21b are respectively provided with sensors for generating color-separated signals of R, G and B, and the image processor units 22a, 22b are designed to effect logarithmic conversion, masking and under-color removal (UCR). The unevenness correction ROM's 26a, 26b are same as those in the first embodiment, but the correction data RAM's 27a, 27b store unevenness correction data for four recording heads of cyan, magenta, yellow and black colors. The binarizing units 32a, 32b are same as those in the first embodiment, but the image recorder units 24a, 24b are color image recorders, each provided with four recording heads for cyan, magenta, yellow and black colors, each head being an ink jet recording head with 256 nozzles.

The present invention can also be applied to the transmission and reception of a color image, by effecting similar operations to those of the first embodiment, in the above-explained circuit structure.

Also in this case, the amount of data to be transmitted or received can be reduced to about ⅛ in comparison with the conventional case of transmitting or receiving the 8-bit multi-value image data, so that the time required for data transmission can be significantly reduced.

In the present invention, the binary (n) state or 256-value (m) state indicates the number of density levels assigned to each pixel, and can be represented respectively by 1-bit data or 8-bit data. However, if plural data (for example Y, M, C and K) correspond to a pixel, as in the case of a color image, the binary state is generally represented by the data of plural bits.

Figure 11:
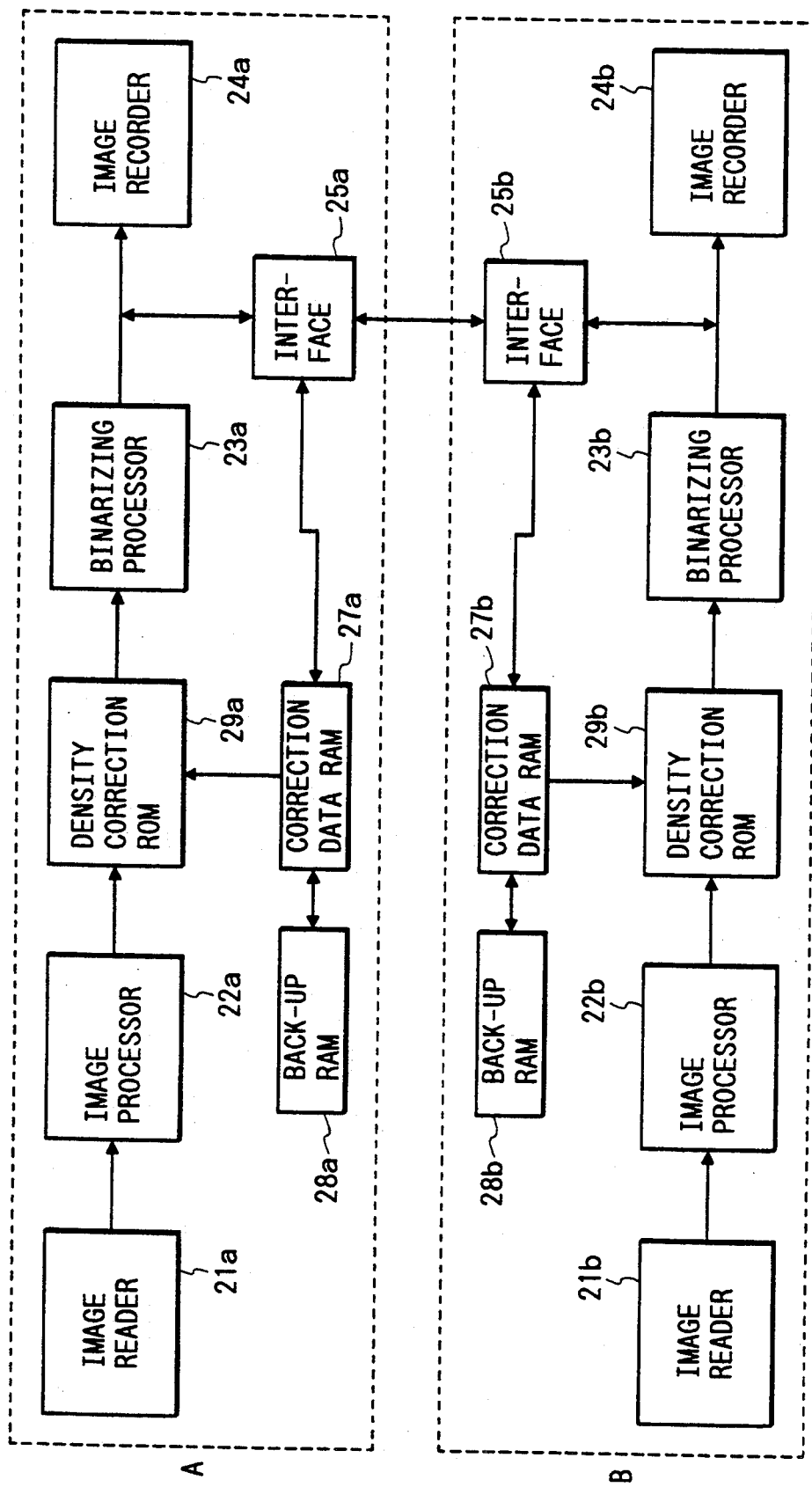
FIG. 11 is a block diagram of a third embodiment of the present invention.
Figure 12:
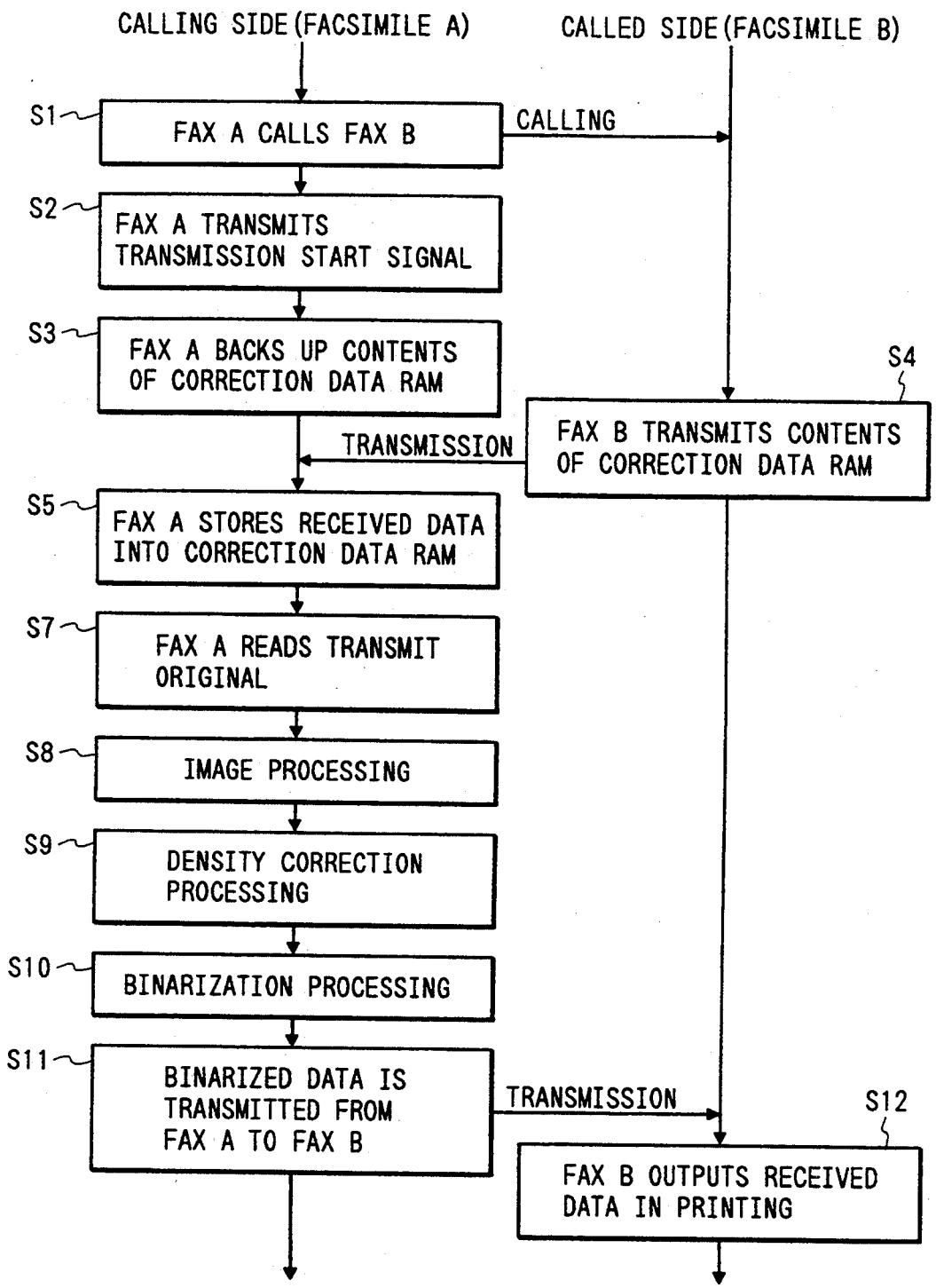
FIG. 12 is a flow chart of the facsimile communicating operation of the third embodiment.

In the following there will be explained a third embodiment of the present invention, with reference to FIGS. 11 and 12. In FIG. 11, same components as those in FIG. 8 are numbered same as therein.

In FIG. 11, the facsimile apparatus A, B are composed of the image reader units 21a, 21b; image processor units 22a, 22b; density correction ROM's 29a, 29b; density correction data RAM's 32a, 32b; back-up RAM's 28a, 28b; binarizing units 23a, 23b; interfaces 25a, 25b; and image recorder units 24a, 24b.

In the present embodiment, each of the density correction ROM's 29a, 29b is provided with a look-up table for 64 straight lines with inclinations which are varied by a step of 0.01 within a range from 0.68 to 1.31, and each of the density correction data RAM's 27a, 27b stores data for selecting said inclination. The image recorder units 24a, 24b are composed of multi-nozzle ink jet printers with 256 nozzles each.

The function of the facsimile apparatus of the present embodiment with the above-explained structure will be explained in the following, with reference to a flow chart shown in FIG. 12.

The following explanation refers to a case of image transmission from the facsimile apparatus A to B for image recording in the facsimile B.

At first the facsimile A calls B in a step S1. When the communication channel is established by a response from the facsimile B, and the facsimile A sends B a transmission start signal. Then, in a step S3, the facsimile A stores the content of the density correction data RAM 27a in the back-up RAM 28a.

On the other hand, upon receiving the transmission start signal from the facsimile A, the facsimile B sends, in a step S4, the content of the density correction data RAM 27b to the facsimile A through the interface 25b. Upon receiving said content through the interface 25a, the facsimile A stores, in a step S5, said content in the density correction data RAM 27a.

Having thus completed the preparation for image transmission, the facsimile A reads the original to be transmitted by the image reader unit 21a in a step S7, and the read image signal is processed, in a step S8, in the image processor unit 22a and sent to the density correction ROM 29a.

In a step S9, the density correction ROM 29a effects density correction by selecting a correction line with an appropriate inclination, according to a signal from the density correction data RAM 27a. In the present embodiment, the image recorder unit 24b is a multi-nozzle ink jet printer with 256 nozzles, so that the correction data are to store the optimum inclination according to the density provided by said recording head. The data for the head is 6 bits, in order to select one of 64 correction lines.

The density correction data RAM 27a, already receiving and storing, in the step S5, the data for correcting the density of the image recording head of the image recorder unit 24b of the facsimile B, selects one of the correction lines of the density correction ROM 29a. After the density correction, the image data are binary digitized, in a step S10, in the binarizing unit 23a by a known digitizing method such as the dither method or the error diffusion method.

Then, in a step S11, the binary image data are sent through the interface 25a to the facsimile B, and, in a step S12, further supplied through interface 25b to the image recorder unit 24b of the facsimile B for image recording therein.

The image data sent to the facsimile B, being already corrected in density according to the characteristic of the image recorder unit 24b thereof, can provide an image with optimum density, so that the necessity for density correction of the received data is reduced.

For transmitting an A4-sized 8-bit image for example with a density of 400 DPI, the conventional method requires, as already explained before, the transmission and reception of information of about $1.24 \times 10^8$ bits as the 8-bit data have to be transmitted and then subjected to the correction of unevenness. On the other hand, the present embodiment enables transmission and reception of the image of optimum density, by the transmission of the unevenness correction data of 6 bits and the binary image data of 15,466,839 bits, or the information of about $1.55 \times 10^7$ bits in total, so that the time and cost required for data transmission can be significantly reduced. It is to be noted that the transmission protocol of the first embodiment shown in FIG. 9 is applicable also to the third embodiment, and that of the third embodiment shown in FIG. 12 is likewise applicable to the first embodiment.

In the following there will be explained a fourth embodiment of the present invention.

The foregoing third embodiment deals with the monochromatic image, but the present invention is not limited to such case. The 4th embodiment is designed to deal with a color image.

The basic structure of the 4th embodiment is made as that of the 3rd embodiment, but the image reader units are provided with sensors for generating color-separated signals of R, G and B, and the image processor units are designed to effect logarithmic conversion, masking and under-color removal (UCR). The density correction ROM's are same as those employed in the 3rd embodiment shown in FIG. 11, but the density correction data RAM's store density correction data for four recording heads of cyan, magenta, yellow and black colors. The binarizing units are same as those in the 3rd embodiment, but the image recorder units 24a, 24b are color image recorders, each provided with four recording heads for cyan, magenta, yellow and black colors, each head being composed of an ink jet recording head with 256 nozzles.

The above-explained 4th embodiment enables, also in the transmission and reception of a color image, the correction of density at the transmitting side, according to the density correction data of the recording heads of different color of the receiving side, through similar operations to those of the 3rd embodiment.

In case of a color image as dealt in the 4th embodiment, the density fluctuation in the recording head of each color appears not only in the density but also as a fluctuation in the color hue. Consequently the adjustment of balance of the densities of the recording heads of different colors is important, and the advantage of the present embodiment is significant.

Figure 13:
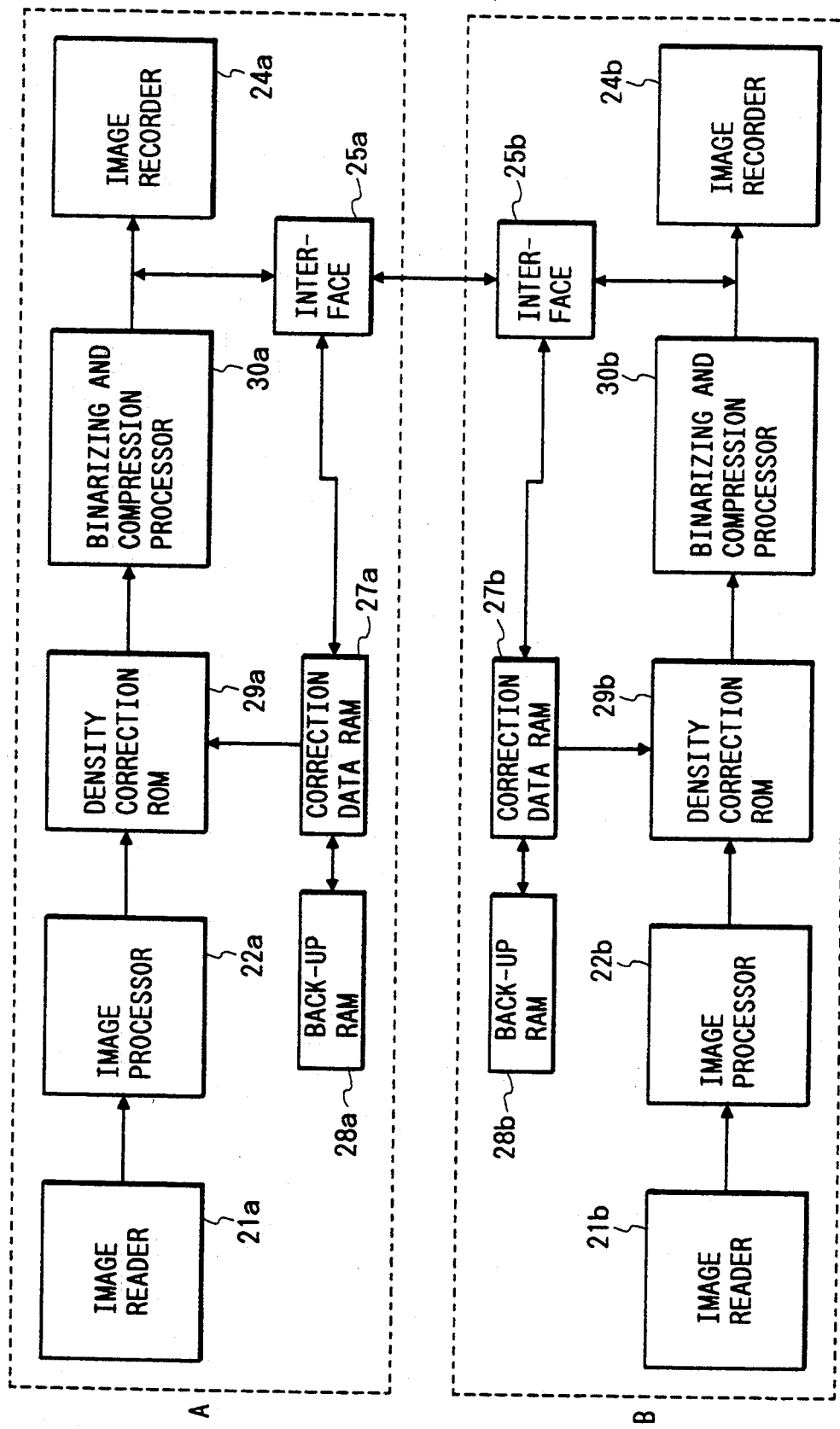
FIG. 13 is a block diagram of a fifth embodiment of the present invention.

Now reference is made to FIG. 13 for explaining a 5th embodiment of the present invention, wherein same components as those in FIG. 11 are represented by same numbers. In the 5th embodiment, the image data are binarized and then compressed in blocks 30a, 30b, and the transmission is made in such compressed state. Thus the image transmission with an appropriate density can be achieved by the transmission and reception of an even less amount of data. A similar structure may also be applied to the first embodiment. In such case data compression is conducted after the unevenness correction and binary digitization but prior to the data transmission.

In the following there will be explained a 6th embodiment of the present invention.

Figure 1:
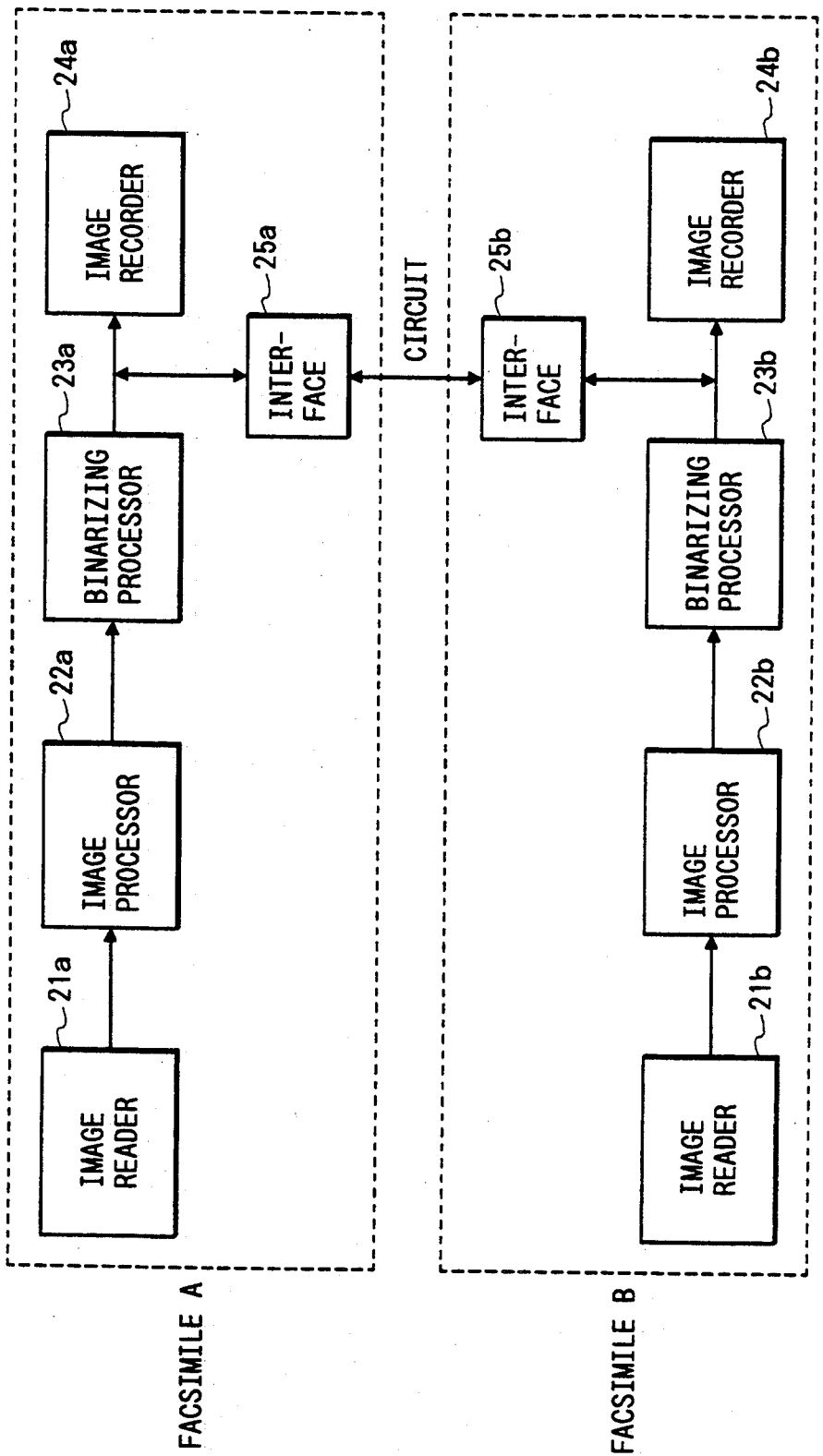
FIG. 1 is a block diagram of a conventional image transmit/receive/recording apparatus.
Figure 2A:
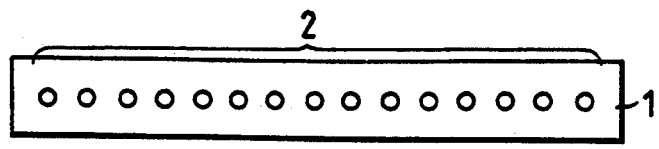
FIGS. 2A to 5 are charts showing the principle of correction of unevenness in the density.
Figure 2B:
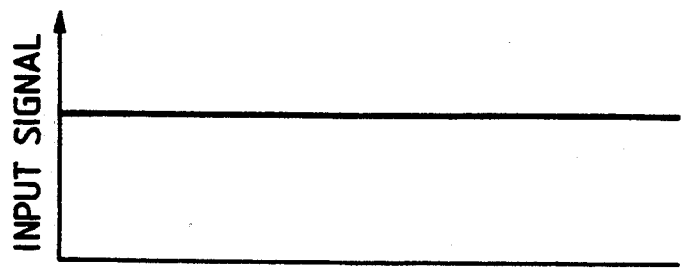
Figure 2C:
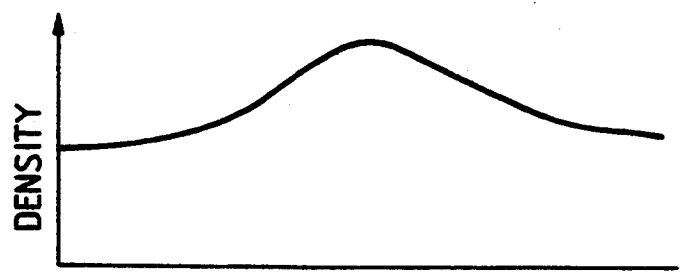
Figure 2D:
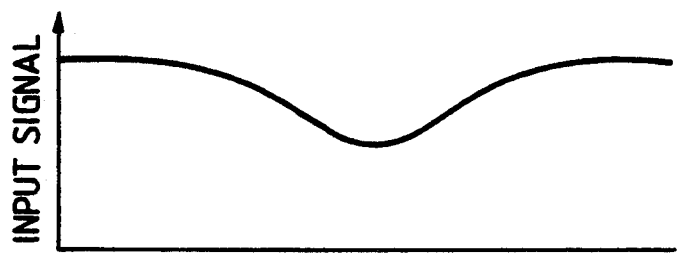
Figure 2E:
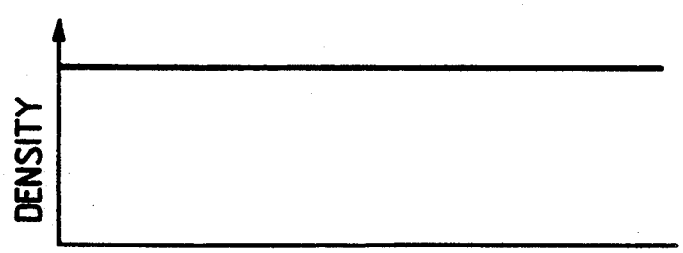
Figure 3:
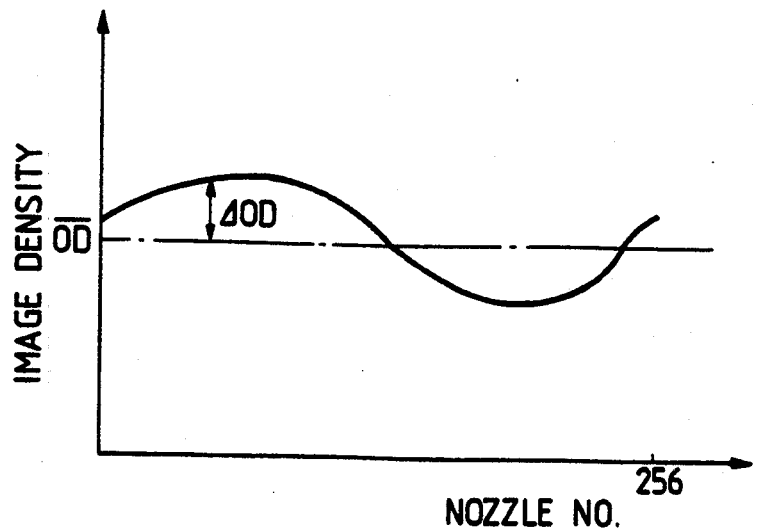
Figure 4:
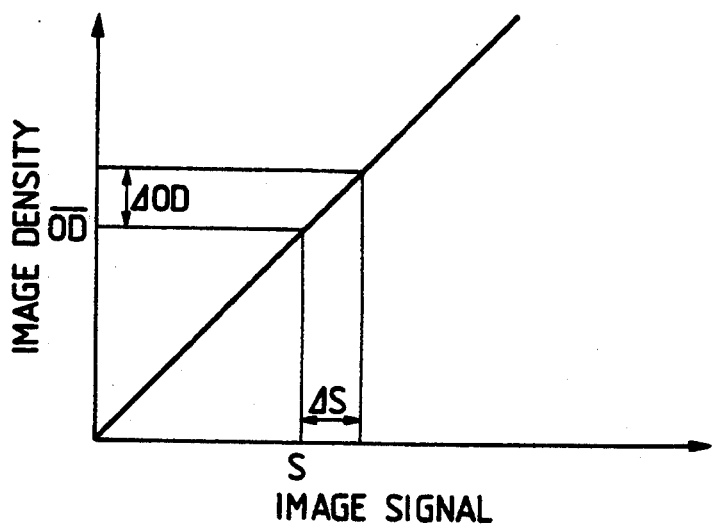
Figure 5:
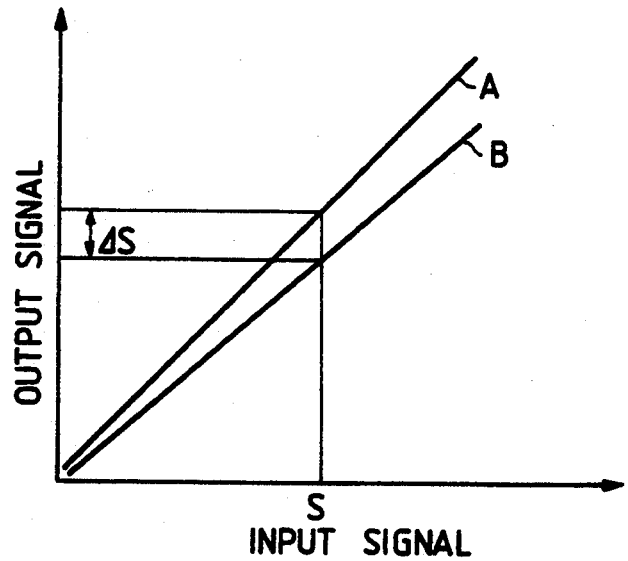
Figure 6:
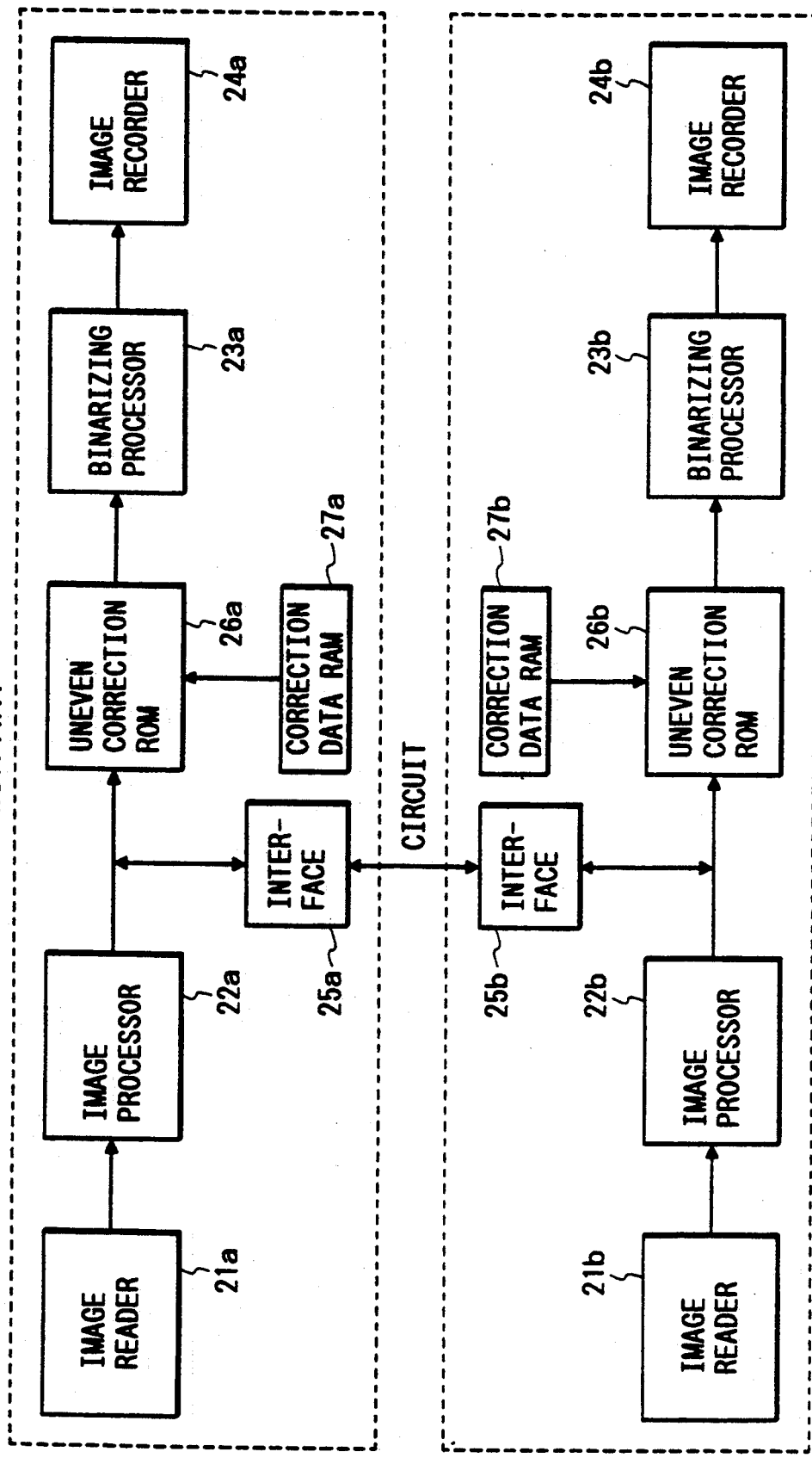
FIGS. 6 and 7 are block diagrams of conventional image transmit/receive-recording apparatus.
Figure 7:
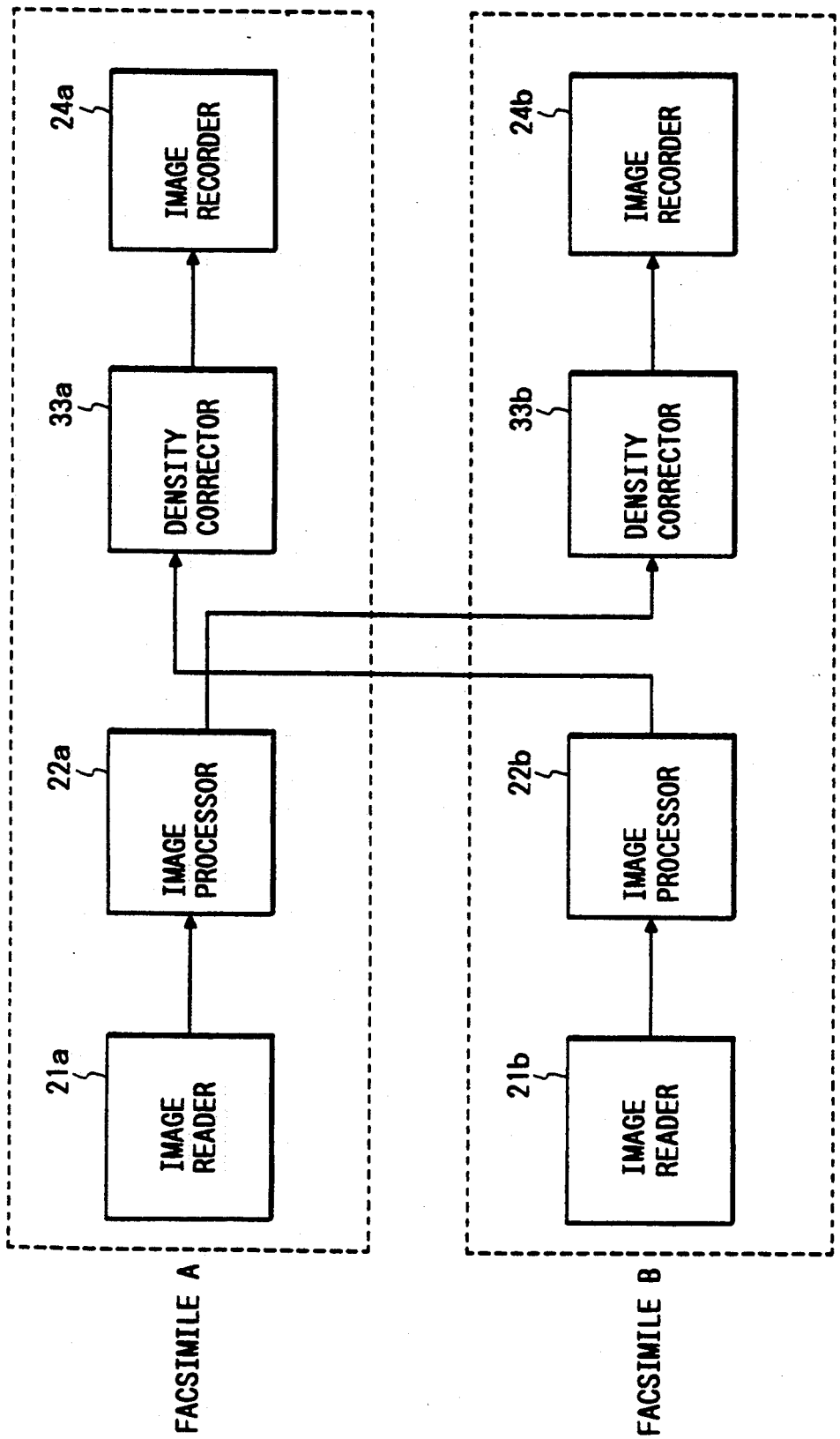
Figure 14:
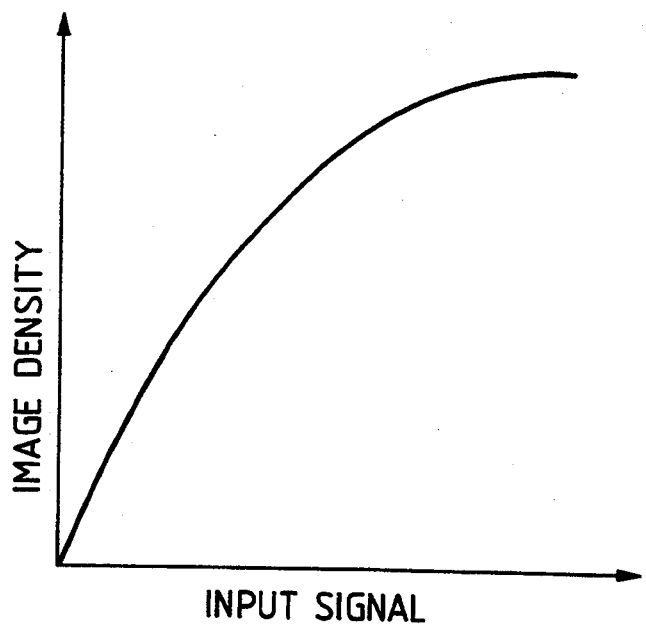
FIG. 14 is a chart showing the relationship between the input signal and the image density.

The foregoing 3rd to 5th embodiments employ straight lines, as shown in FIG. 5, for the look-up table in the density correction ROM, but the relationship between the input signal and the image density is often non-linear as shown in FIG. 14. In such case a mere correction of the inclination of a straight line cannot correct the density over the entire density range. The 6th embodiment provides an improvement on this point, by employing non-linear curves in the density correction ROM.

Figure 15:
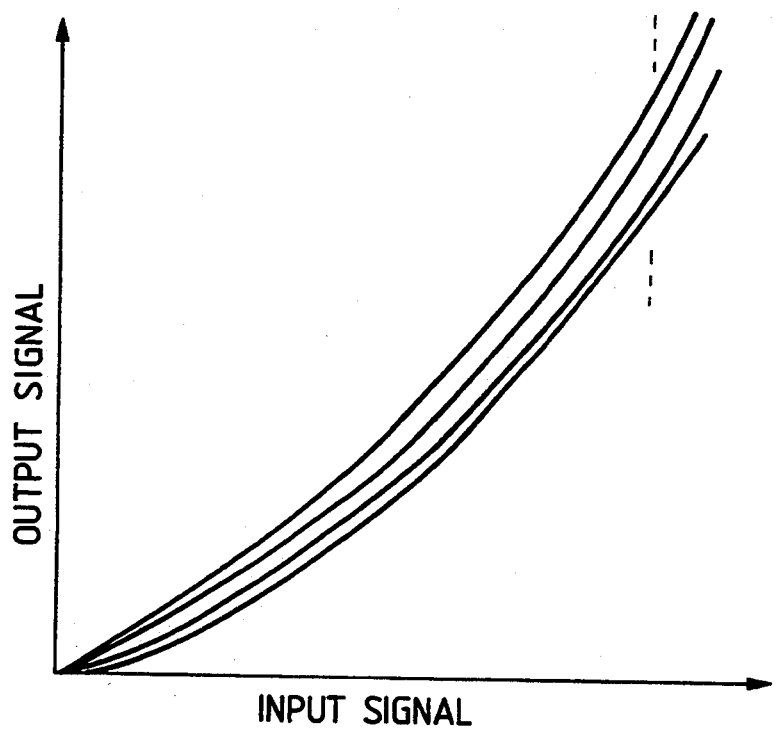
FIG. 15 is a chart showing the density correction table of a 4th embodiment of the present invention.

FIG. 15 shows curves of the look-up table of the density correction ROM to be employed in the present embodiment. There are provided 64 non-linear curves, which are to correct the tonal characteristic for gradually different dot sizes, and are determined by experiments or by simulation. The present embodiment enables the transmission and reception of an image with appropriate density over the entire range, by employing the look-up table of the above-explained structure and selecting an optimum curve according to the density correction data of each recording head as in the above-explained 3rd to 5th embodiments.

In the following there will be explained a 7th embodiment of the present invention. In the foregoing embodiments, the unevenness correction data or the density correction data are transmitted prior to the transmission of image data, but repeated transmission of same data is unnecessary between the apparatus which are in frequent communication. The 7th embodiment is to provide an improvement on this point.

In the 7th embodiment, prior to the transmission of the correction data, a code number specific to each apparatus is transmitted. For this purpose, each facsimile apparatus is given a 16-bit code number, such as FFF1 for the facsimile A and FFF2 for the facsimile B.

In case of image transmission from the facsimile A to B, the unevenness correction data of the facsimile B have to be sent to the facsimile A, but the code number FFF2 of said facsimile B is sent to A in advance.

In response, the facsimile A effects correction of the image data, utilizing the unevenness or density correction data of the facsimile B, and sends the corrected image data to the facsimile B, which in response effects image recording with thus received corrected image data. After the image transmission and reception in this manner, the code number FFF2 of the facsimile B and the unevenness or density correction data thereof, remaining in the correction data RAM of the facsimile A, are stored in the back-up RAM.

Then, at the next image transmission from the facsimile A to B, the facsimile B sends its code number FFF2 to the facsimile A. The facsimile A compares said code number with the code numbers stored in the back-up RAM, and, if the same code number is found, it transfers the unevenness or density correction data of the facsimile B, stored in correspondence with said code number, to the correction data RAM 32a and sends a correction data reception completion signal to the facsimile B. In response the facsimile B suspends the transmission of the correction data to the facsimile A.

In this manner it is rendered possible to effect the correction of unevenness or density merely by the transmission of a 16-bit code number from an apparatus from which the unevenness or density correction data were received before, by storing the code number of said apparatus and the unevenness or density correction data in pair in the back-up RAM and accessing to said correction data in the back-up RAM through the transmission of said code number prior to the transmission of the correction data.

Thus, after the unevenness or density correction data are once transmitted from the receiving side to the transmitting side, such correction data need not be transmitted again and the time required for said transmission can be dispensed with.

In the following there will be explained an 8th embodiment of the present invention.

In the foregoing embodiments, the characteristic data of the recording head of the receiving side is transmitted therefrom to the transmitting side. In this 8th embodiment, the correction data RAM's 27a, 27b shown in FIG. 8 or 11 are composed of detachable IC cards, which store the characteristic data of the recording head of the receiving side. The storage of the characteristic data into the IC card is conducted at the receiving side, and such IC card is sent in advance to the transmitting side for example by mailing. In this manner the transmission of the characteristic data from the receiving side to the transmitting side can be dispensed with.

In this manner the present embodiment enables transmission of a satisfactory image with a limited amount of information, thereby allowing to reduce the time required for transmission.

Figure 16:
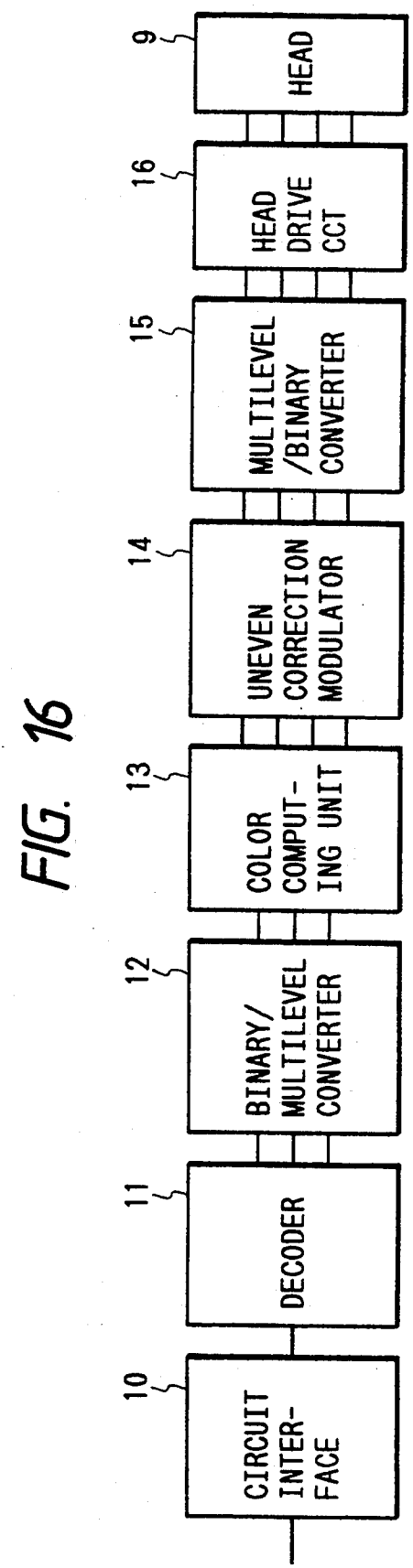
FIG. 16 is a block diagram of a ninth embodiment of the present invention.

In the following there will be explained a 9th embodiment of the present invention. FIG. 16 is a block diagram of said 9th embodiment, in which binary R, G and B signals, obtained from a full-color image signal by the error diffusion method for pseudo tonal rendition, are compressed by MMR (modified modified Reed) encoding and transferred to an interface 10. The signals received by said interface 10 are expanded in a decoder 11 to reconstruct the original R, G, B binary bit map signals. Then multi-value signals are obtained by two-dimensional filtering in a binary-multi-value converter 12. In the present embodiment, 128-value signals are obtained by a 3×3 matrix. Said 128-level R, G, B signals are then subjected to masking and under-color removal in a color computing unit 13 so as to correspond to the characteristic of the printer, thereby obtaining 128-level C, M, Y and K signals. These signals are then subjected to correction of unevenness in an unevenness correction modulator 14. The printer employed in this embodiment is an ink jet printer employing, for each color, a multi-nozzle ink jet recording head 9 including 128 elements arranged with a density of 400 dpi. The structure of said printer is schematically shown in FIG. 17.

Figure 17:
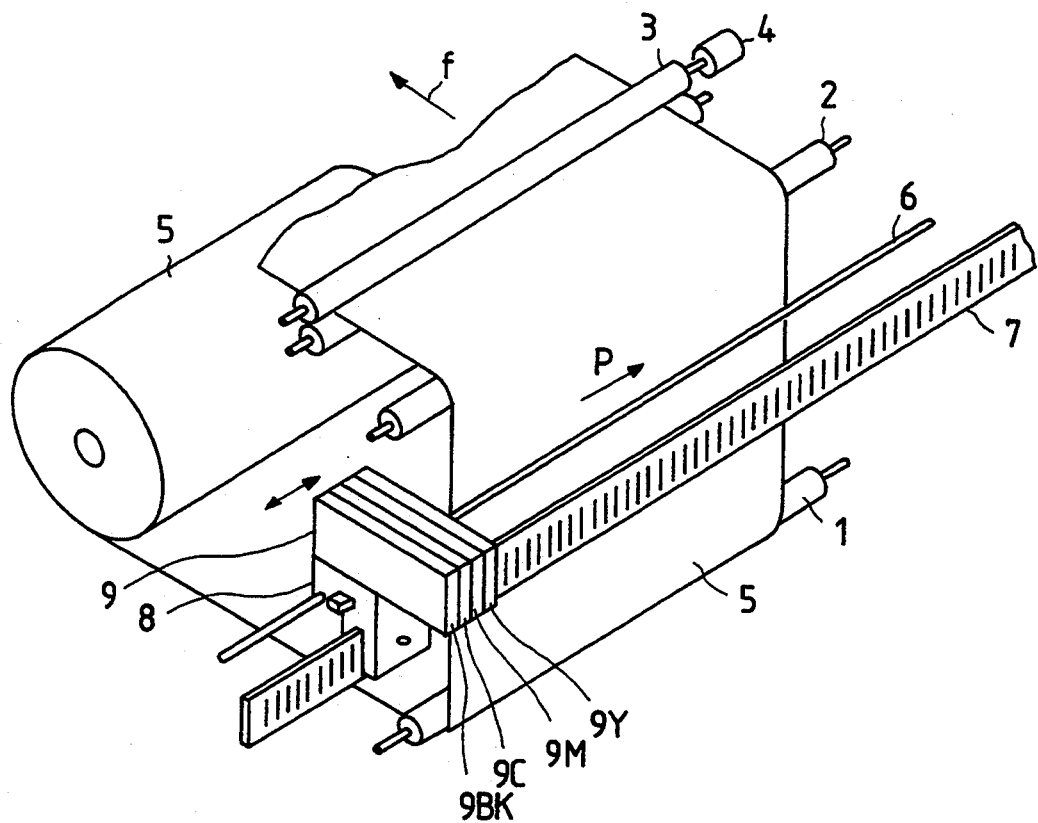
FIG. 17 is a schematic perspective view of the mechanism of the ninth embodiment.

Referring to FIG. 17, a rolled recording sheet 5 is guided by transport rollers 1, 2, then pinched by feed rollers 3 and advanced in a direction f by means of a sub-scanning motor 4 linked with said feed rollers 3. Across said recording sheet 5, there are provided parallel guide rails 6, 7 along which an ink jet recording head 9 supported by a carriage 8 can reciprocate in the lateral direction. Said recording head 9 is based on a method of inducing a state change such as film boiling in the ink by means of thermal energy, and discharging the ink from a discharge opening (nozzle) toward the recording sheet, utilizing the bubble generated by said state change, and is suitable for binary recording.

Said recording sheet 5 is intermittently advanced by said sub-scanning motor in such a manner as to obtain recorded images in continuous manner. While the recording sheet 5 is stopped, the recording head 9 moves in the main scanning direction P by a main scanning motor (not shown), and discharges ink droplets according to the image signals supplied thereto. In this manner the desired recorded image is formed on the entire area of the recording sheet 5, by relative movement of the recording head 9 and the recording sheet 5. The recording head 9 is provided with 128 recording elements (128 ink discharge nozzles in the present embodiment) arranged in a linear array with a pitch of 63.5 μm (400 dpi). Thus, there may result an unevenness in the recorded image, because of slight fluctuation in the amount of ink discharged from these elements.

Figure 18:
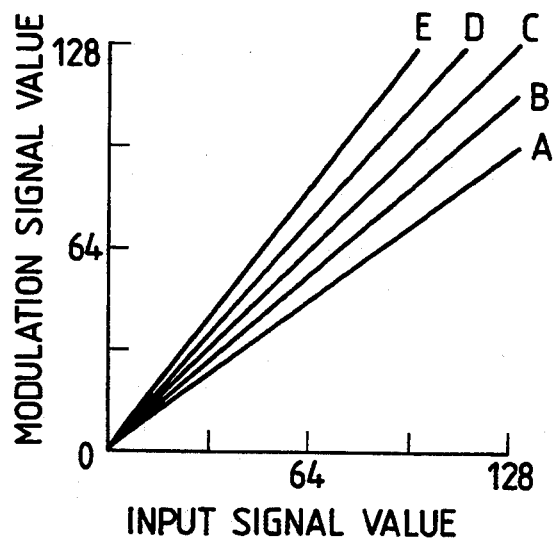
FIG. 18 is a chart showing the function of an unevenness correcting modulator.

Thus, the fluctuation in the amount of ink discharge, specific to each element is measured in advance and stored as correction data in a memory, and the input signals are modulated according to the characteristics shown in FIG. 18. If the amount of ink discharge is a standard amount, there is selected a correction line C whereby the input signal remains unchanged after modulation. For the elements with a larger amount of ink discharge, there is selected a correction line A or B in order to reduce the signal value after modulation, according to the amount of aberration from the standard state. A line D or E is selected in the opposite case. In the present embodiment there are provided 64 correction tables for correcting the fluctuation in the amount of ink discharge in the nozzles. The C, M, Y and K signals subjected to the above-explained correction of unevenness are further subjected to gamma correction by an unrepresented tone corrector, and are converted from 128 levels to binary state by a multi-value-binary converter 15, utilizing the error diffusion method. The obtained binary signals are supplied through a head driver circuit 16 to the recording head 9 for obtaining an image of high quality.

This embodiment enables high-speed communication, since the R, G, B binary signals are transmitted in compressed state. Also this embodiment provides the advantages of an open system, since the transmitted signals are not affected by the characteristics of the terminals, namely the transmitting side or the receiving side. Furthermore precise color computation is possible for obtaining a color image of high quality, as the R, G, B binary signals transmitted at a high speed are converted into multi-value signals. Furthermore, as the multi-value signals are modulated according to the fluctuation in the performance of the recording elements, a uniform tonal recording can be obtained with a binary printer of a high reliability.

In the following there will be explained a 10th embodiment capable of achieving even higher image quality, by varying the amount of modulation in the unevenness correction modulator according to the change in the recording speed. This is to cope with, in image transmission in the compressed state, the variation in the recording speed, eventually resulting from differences in the compression rate depending on the location in the image.

Figure 19:
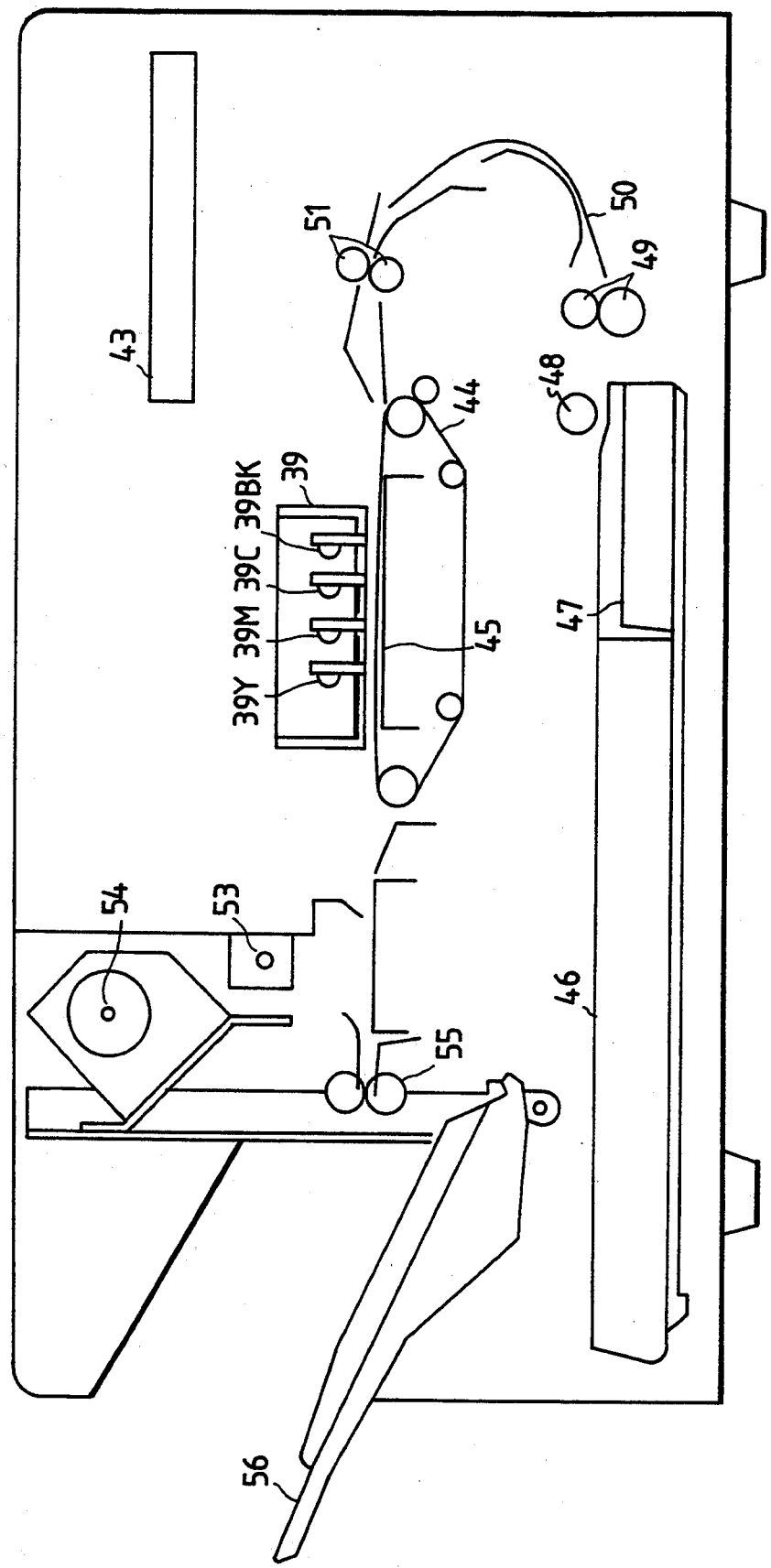
FIG. 19 is a schematic view of a tenth embodiment of the present invention.

FIG. 19 is a schematic view of a printer employing so-called full-multi recording head, in which recording elements are arranged over the entire recording width. A recording head 59 is provided, for each of Y, M, C and K colors, with a linear array of about 4700 recording elements arranged with a pitch of 400 dpi, and has a recording with of 297 mm. There are further shown a capping unit 43 for capping said recording head 59; a static attraction belt 44 for attracting a recording sheet; a platen 45; a sheet feeding cassette 46; recording sheets 47; a pick-up roller 48; transport rollers 49, 51; a transport path 50; a heater 53; a fan 54; discharge rollers 55; and a tray 56.

FIG. 20 is a block diagram of the control system of the apparatus shown in FIG. 19, wherein same components as those in FIG. 16 are represented by same numbers and will not be explained further. There are provided data buffers 67-69 for compensating the delays among recording heads 59Y-59K, and a counter 70 for measuring the interval between the lines. Said counter 70 measures the interval of a signal released from the decoder 61 at the reception of data of every line. The unevenness correction modulator 64 effects the unevenness correction according to the measured line interval, namely the drive frequency of the recording elements, because the state of density unevenness varies depending on said drive frequency. In the present embodiment, the interval T between the lines is segmented in 7 regions of 125 μsec. each within a range from 250 μsec. to 1 sec. and an 9th region of longer than 1 sec., and the characteristics of the recording elements (fluctuation in the discharge amount) are measured in advance in each of said regions and stored in the memory, as the correction data for selecting one of the correction lines A–E shown in FIG. 18. The correction of unevenness in density is conducted by modulating the input signal, based n the interval T of the lines, utilizing said correction data.

As explained in the foregoing, the present embodiment corrects the density unevenness, resulting from the change in the recording speed (drive frequency) induced by the variation in the image compression rate, by modulating the input signal according to the recording speed, thereby providing the image of improved image quality.

In the present embodiment, the image compression rate is taken as a cause of variation in the recording speed (drive frequency), but it is also varied by the transfer rate of the communication channel. Consequently a similar effect can be obtained by modulating the input signal according to the transfer rate.

In the following there will be explained an 11th embodiment, in which the present invention is applied to a printer with improved tonal reproduction by the dark-light ink recording method, employing drak and light inks for each color. This embodiment is also extremely effective, since the binary R, G, B signals can be received in the same manner as in the 9th embodiment shown in FIG. 16 and can be processed subsequently in a different manner.

Figure 21:
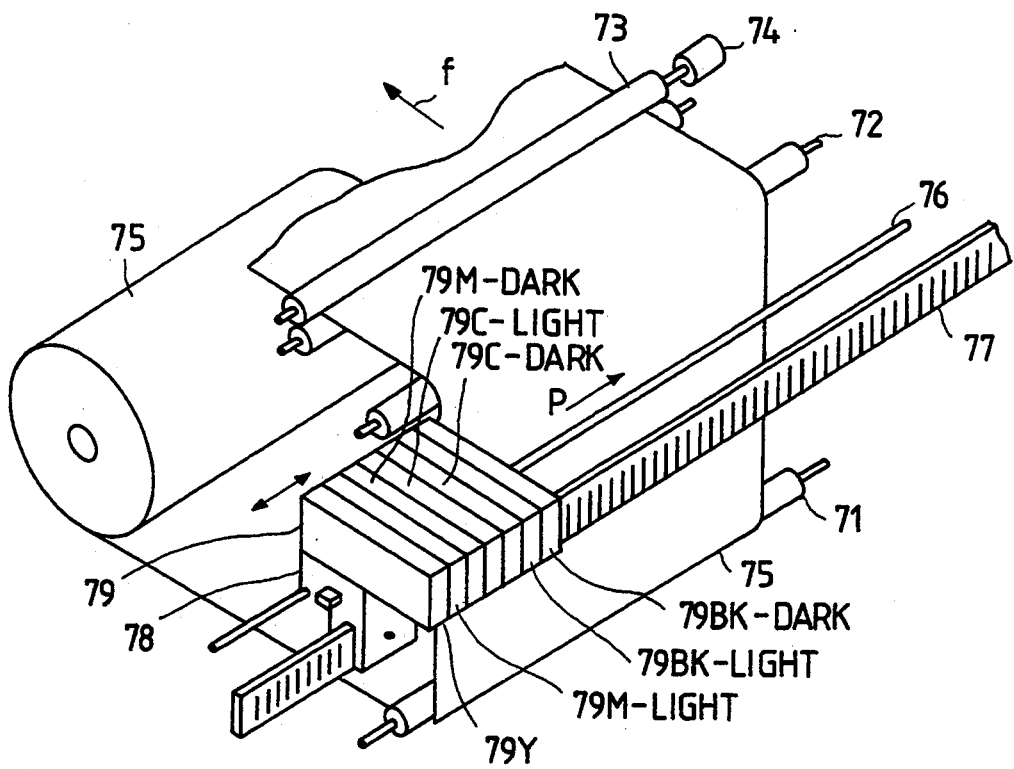
FIG. 21 is a schematic perspective view of the mechanism of an eleventh embodiment of the present invention.
Figure 23:
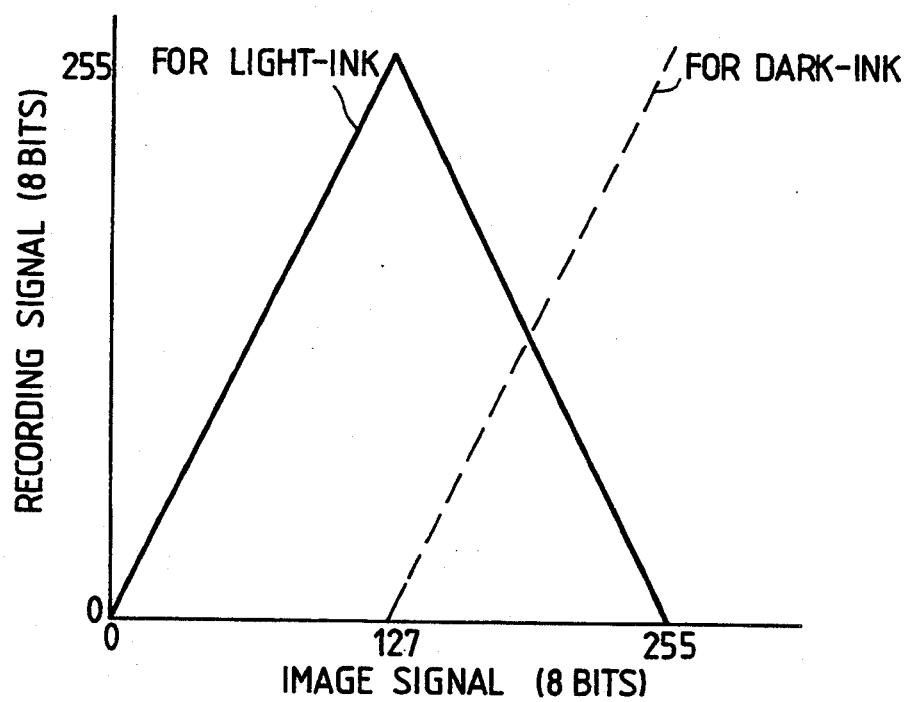
FIG. 23 is a chart showing the function of a density selector.

FIGS. 21 and 22 are respectively a schematic external view and a block diagram of the present embodiment, wherein components corresponding to those in FIGS. 16 and 17 are represented by same symbols and will not be explained further. In FIG. 21, the yellow (Y) color alone is represented by dark ink, while each of magenta (M), cyan (C) and black (Bk) colors is represented by dark and light inks, and there are correspondingly provided recording heads 79Y, 79M-dark, 79M-light, 79C-dark, 79C-light, 79Bk-dark and 79Bk-light. A concentration splitter 87 shown in FIG. 22 generates recording signals for the dark and light inks, by effecting a calculation shown in FIG. 23 for each of the C, M and Bk colors.

As explained in the foregoing, this embodiment effects the splitting between the dark and light colors and the correction of unevenness by converting the binary image signals into the multi-value image signals, thereby improving the tonal reproducing ability and providing the image of higher image quality.

The foregoing 9th to 11th embodiments employ an ink jet printer, but other printers such as thermal printer or electrophotographic printer may be likewise employed. Also the present invention is not limited to the binary recording method, nor to the color image recording, nor to the printer employing a multi-element recording head. For example, after the binary-multi-value conversion of image data, there may be conducted modulation of said image data according to the tonal characteristic of a single recording element.

As detailedly explained in the foregoing, the present invention enables to conduct high-speed communication and to obtain a received image of high image quality.

The foregoing embodiments are applied to facsimile apparatus, but they need not be designed for communication through the telephone lines. For example, the present invention is applicable also to equipment within a local area network, or even to mutually connected several digital image equipment.

Also the recording head of the image recorder unit is not limited to the ink jet recording head, but the present invention is likewise applicable to any multiple recording head provided with plural image recording elements, such as a thermal transfer recording head or an electrostatic recording head. Also the image data in the present invention need not necessarily be binarized, but can be converted to a multi-value state, for example in case of an image transmit/receiving system capable of multi-value recording.

Also in the foregoing embodiments, the density and unevenness correction data are taken as the characteristic data of the recording head, but the present invention is not limited to such data.

Also the image transmitting unit need not necessarily be provided with the image reader unit but may be designed to transmit, for example, graphic data from a computer.

The present invention brings about excellent effects with a recording head or a recording device of the ink jet system utilizing thermal energy, among various ink jet recording systems.

As to its representative construction and principle, for example, one practiced by use of the basic principle disclosed in, for example, the U.S. Pat. Nos. 4,723,129 and 4,740,796 is preferred. This system is applicable to either of the so-called on-demand type and the continuous type. Particularly, the case of the on-demand type is effective because, by applying at least a driving signal which gives rapid temperature elevation exceeding nucleus boiling corresponding to the recording information on an electrothermal converters arranged corresponding to the sheets or liquid channels holding liquid (ink), heat energy is generated at said electrothermal converters to effect film boiling at the heat acting surface of the recording head, and consequently the bubbles within the liquid (ink) can be formed corresponding one by one to the driving signals. By discharging the liquid (ink) through an opening for discharging by growth and shrinkage of the bubble, at least one droplet is formed. By making the driving signals into pulse shapes, growth and shrinkage of the bubble can be effected instantly and adequately to accomplish more preferably discharging of the liquid (ink) particularly excellent in response characteristic. As the driving signals of such pulse shape, those as disclosed in the U.S. Pat. Nos. 4,463,359 and 4,345,262 are suitable. Further excellent recording can be performed by employment of the conditions described in the U.S. Pat. No. 4,313,124 of the invention concerning the temperature elevation rate of the above-mentioned heat acting surface.

As the constitution of the recording head, in addition to the combination constitutions of discharging orifice, liquid channel, electrothermal converter (linear liquid channel or right angle liquid channel) as disclosed in the above-mentioned respective specifications, the constitution by use of the U.S. Pat. Nos. 4,558,333 and 4,459,600 disclosing the constitution having the heat acting portion arranged in the flexed region is also included in the present invention. In addition, the present invention can be also effectively made the constitution as disclosed in Japanese Patent Laid-Open Application No. 59-123670 which discloses the constitution using a slit common to a plurality of electrothermal converters as the discharging portion of the electrothermal converter or Japanese Patent Laid-Open Application No. 59-138461 which discloses the constitution having the opening for absorbing pressure wave of heat energy correspondent to the discharging portion.

Further, as the recording head of the full line type having a length corresponding to the maximum width of recording medium which can be recorded by the recording device, either the constitution which satisfies its length by combination of a plurality of recording heads as disclosed in the above-mentioned specifications or the constitution as one recording head integrally formed may be used, and the present invention can exhibit the effects as described above further effectively.

In addition, the present invention is effective for a recording head of the freely exchangeable chip type which enables electrical connection to the main device or supply of ink from the main device by being mounted on the main device, or for the case by use of a recording head of the cartridge type provided integrally on the recording head itself.

Also, addition of a restoration means for the recording head, a preliminary auxiliary means, etc. provided as the constitution of the recording device of the present invention is preferable, because the effect of the present invention can be further stabilized. Specific examples of these may include, for the recording head, capping means, cleaning means, pressurization or aspiration means, electrothermal converters or another heating element or preliminary heating means according to a combination of these, and it is also effective for performing stable recording to perform preliminary mode which performs discharging separate from recording.

Further, as the recording mode of the recording device, the present invention is extremely effective for not only the recording mode only of a primary color such as black etc., but also a device equipped with at least one of plural different colors or full color by color mixing, whether the recording head may be either integrally constituted or combined in plural number.

What is claimed is:

1. An image transmitting apparatus used as a transmitting unit in a system including the transmitting unit and a receiving unit connected to the transmitting unit by way of a line, comprising:
    data output means for releasing image data, from an image reader or an image processor, which is coupled to said data output means, of m (>2) values, for transmission to a receiving unit which includes a recording head equipped with plural image recording elements for recording an image;
    correction means for correcting the image data of m values, released from said data output means, based on characteristic data of the recording head of the receiving unit;
    conversion means for converting the image data of m values, corrected by said correction means, into image data of n (<m) values; and
    transmission means for transmitting the image data of n values, converted by said conversion means, to the receiving unit.

2. An apparatus according to claim 1, further comprising:
    memory means for storing the characteristic data of the recording head of said receiving unit.

3. An apparatus according to claim 1, wherein said characteristic data are correction data for the unevenness in density of said recording head, and said correction means is adapted to effect correction of unevenness in density on the image data of m values.

4. An apparatus according to claim 1, wherein said image data consist of data of plural colors.

5. An image transmitting and receiving apparatus used as a transmitting unit in a system including the transmitting unit and a receiving unit connected to the transmitting unit by way of a line, comprising:
    data output means for releasing image data, from an image reader or an image processor, which is coupled to said data output means, of m (>2) values, for transmission to the receiving unit which includes a recording head equipped with plural image recording elements for recording an image;
    reception means for receiving characteristic data of the recording head of the receiving unit, to be transmitted from the receiving unit;
    memory means for storing said characteristic data received by said reception means;
    correction means for correcting the image data of m values released from said data output means, based on the characteristic data stored in said memory means;
    conversion means for converting the image data of m values, corrected by said correction means, into image data of n (<m) values; and
    transmission means for transmitting the image data of n values, converted by said conversion means to the receiving unit.

6. An apparatus according to claim 5, wherein said characteristic data are correction data for the unevenness in density of said recording head, and said correction means is adapted to effect correction of unevenness in density on the image data of m values.

7. An apparatus according to claim 5, wherein said reception means is adapted to receive, from said receiving unit, an identification signal specific to said receiving side, and said correction means is adapted to effect correction based on the characteristic data corresponding to said received identification signal, among the characteristic data stored in said memory means.

8. An apparatus according to claim 5, wherein said conversion means is adapted to convert the image data of n values into binary image data.

9. An apparatus according to claim 5, wherein said data output means is adapted to release the image data of m values by reading an original image.

10. An apparatus according to claim 5, wherein said recording head is an ink jet recording head for forming a record by ink discharge.

11. An apparatus according to claim 5, wherein said recording head is provided with plural discharge openings for ink discharge, and said image recording elements are provided respectively corresponding to said discharge openings and are composed of thermal energy generating members, each of which is adapted to induce a state change in the ink by heat and to discharge the ink from said discharge opening based on said state change, thereby forming a flying ink droplet.

12. An apparatus according to claim 5, wherein said image data consist of data of plural colors.

13. An apparatus according to claim 12, wherein said recording head is an ink jet recording head for forming a record by discharging inks of plural colors, corresponding to data of plural colors.

14. An image transmitting and receiving and recording apparatus used as a receiving unit in a system including the receiving unit and a transmitting unit connected to the receiving unit by way of a line, comprising:

recording means for recording an image with a recording head equipped with plural image recording elements;

transmission means for transmitting characteristic data of the recording head of said recording means to the transmitting unit; and reception means for receiving the image data, which have been corrected in said transmitting unit, in a state of m ($>2$) values, based on the characteristic data transmitted by said transmission means and then converted to a state of n ($<m$) values.

15. An apparatus according to claim 14, wherein said characteristic data are correction data for the unevenness in density of said recording head, and the correction in said transmitting unit is correction for the unevenness in density on the image data of m values.

16. An apparatus according to claim 14, wherein said image data consist of data of plural colors.

17. An apparatus according to claim 16, wherein said recording head is an ink jet recording head for forming a record by discharging inks of plural colors, corresponding to data of plural colors.

18. An image transmitting and receiving and recording method between a transmitting unit which transmits image data of m ($>2$) values to be transmitted, after conversion thereof into image data of n ($<m$) values, and a receiving unit which receives the image data of n values transmitted from the transmitting unit and effects image recording with a recording head equipped with plural image recording elements, comprising:

a step of transmitting characteristic data of the recording head to the transmitting unit by the receiving unit;

a step of receiving characteristic data transmitted from the receiving unit, then corrects the image data of m values based on the characteristic data, and transmitting image data in a form of the image data of n values to the receiving unit by the transmitting unit; and a step of receiving the image data of n values transmitted from the transmitting unit and recording an image with the recording head of the receiving unit.

19. A method according to claim 18, wherein said characteristic data are correction data for the unevenness in density of said recording head, and the correction in said transmitting unit is correction for the unevenness in density on the image data of m values.

20. A method according to claim 18, wherein said image data consist of data of plural colors.

21. A method according to claim 20, wherein said recording head is an ink jet recording head for forming a record by discharging inks of plural colors, corresponding to data of plural colors.

22. An image transmitting apparatus used as a transmitting unit in a system including the transmitting unit and a receiving unit connected to the transmitting unit by way of a line, comprising:

data output means for releasing image data, from an image reader or an image processor, which is coupled to said data output means, of m ($>2$) values, for transmission to the receiving unit which includes a recording head equipped with plural image recording elements for recording an image;

density correction means for effecting density correcting on the image data of m values, stored in memory means at the transmitting unit, released from said data output means, based on recording density correction data of the recording head receiving unit;

conversion means for converting the image data of m values, subjected to density correction by said density correction means, into image data of n ($<m$) values; and transmission means for transmitting the image data of n values, converted by said conversion means, to the receiving unit.

23. An apparatus according to claim 22, further comprising:

memory means for storing the recording density correction data of the recording head of said receiving unit.

24. An image transmitting and receiving apparatus used at a transmitting unit in a system including the transmitting unit and a receiving unit connected to the transmitting unit by way of a line, comprising:

data output means for releasing image data of m ($>2$) values, for transmission to the receiving unit which includes a recording head equipped with plural image recording elements for recording an image;

reception means for receiving recording density correction data of the recording head of the receiving unit to be transmitted from the receiving unit;

memory means for storing said recording density correction data received by said reception means;

density correction means for effecting density correction on the image data of m values released from said data output means, based on the recording density correction data stored in said memory means;

conversion means for converting the image data of m values, subjected to density correction by said density correction means, into image data of n ($<m$) values; and transmission means for transmitting the image data of n values, converted by said conversion means, to the receiving unit.

25. An apparatus according to claim 24, wherein said transmitted and received image is a color image.

26. An apparatus according to claim 24, wherein said conversion means is adapted to convert the image data of m values into binary image data.

27. An apparatus according to claim 24, wherein said data output means is adapted to release the image data of m values by reading an original image.

28. An apparatus according to claim 24, wherein said recording head is an ink jet recording head for forming a recording by ink discharge.

29. An apparatus according to claim 24, wherein said recording head is provided with plural discharge openings for ink discharge, and said image recording elements are provided respectively corresponding to said discharge openings and are composed of thermal energy generating members, each of which is adapted to induce a state change in the ink by heat and to discharge the ink from said discharge opening based on said state change, thereby forming a flying ink droplet.

30. An image transmitting and receiving and recording apparatus used as a receiving unit in a system including the receiving unit and a transmitting unit connected to the receiving unit by way of a line, comprising:

recording means for recording an image with a recording head equipped with plural image recording elements;

transmission means for transmitting recording density correction data, from memory means, of the recording head of said recording means to a transmitting unit; and reception means for receiving image data which have been corrected in the transmitting unit, in a state of m (>2) values, based on the recording density correction data transmitted by said transmission means and then converted to a state of n (<m) values.

31. An image transmitting and receiving and recording method between a transmitting unit which transmits image data of m (>2) values to be transmitted, after conversion thereof into image data of n (<m) values, and a receiving unit which receives the image data of n values transmitted from the transmitting unit and which records an image with a recording head equipped with plural image recording elements, comprising:

a step of transmitting recording density correction data, from memory means, of the recording head to the transmitting unit by the receiving unit;

a step of receiving the recording density correction data transmitted from the receiving unit, and performing density correction on the image data of m values based on the recording density correction data, and transmitting image data in a form of the image data of n values to the receiving unit by the transmitting unit; and a step of receiving the image data of n values transmitted from the transmitting unit and recording an image with the recording head of the receiving unit.

32. An image receiving and recording apparatus, connected to an image transmitting apparatus by way of a line, comprising:

receiving means for receiving a binary image signal from the image transmitting apparatus;

binary-multi-value conversion means for converting the received binary image signal into a multi-value image signal;

modulation means for modulating the multi-value image signal, converted by said conversion means, according to characteristic data of a recording element; and drive means for driving the recording element, according to the multi-value image signal modulated by said modulation means, thereby performing image recording.

33. An apparatus according to claim 32, wherein said drive means is adapted to convert the image signal, modulated by said modulation means, into a binary image signal and to drive said recording element with said binary image signal.

34. An apparatus according to claim 32, comprising a recording head in which a plurality of said recording elements are arranged along a predetermined direction, wherein said modulation means is adapted to modulate said multi-value image signal so as to correct the fluctuation in characteristic among the plural recording elements of said recording head.

35. An apparatus according to claim 34, wherein the recording elements of said recording head are provided with ink discharge openings for ink discharge.

36. An apparatus according to claim 35, wherein the recording elements of said recording head are respectively provided with thermal energy generating means, each of which is adapted to induce a state change in the ink by heat and to discharge the ink from the discharge opening based on said state change, thereby forming a flying ink droplet.

37. An apparatus according to claim 32, wherein said recording element is adapted to record the received image signal with plural colors.

38. An apparatus according to claim 32, wherein said modulation means is adapted to modulate said multi-value image signal, according to characteristic corresponding to the recording speed of said recording element.

39. An apparatus according to claim 32, adapted for use in a facsimile apparatus which receives and records an image signal transmitted through a communication channel.

40. An apparatus according to claim 32, wherein said image signal consists of data of plural colors.

41. An apparatus according to claim 40, wherein said recording element is adapted to effect recording with plural colors, corresponding to said data of plural colors in said received image signal.

42. A first image transmitting and receiving apparatus connected by way of a line to a second image transmitting and receiving apparatus, with each of said first transmitting and receiving apparatus and said second transmitting and receiving apparatus comprising:

data output means for releasing image data of m (>2) values, for transmission to another apparatus which includes a second recording head equipped with plural image recording elements for recording an image;

reception means for receiving characteristic data of the second recording head of said another apparatus, to be transmitted from said another apparatus;

memory means for storing said characteristic data received by said reception means;

correction means for correcting the image data of m values released from said data output means, based on the characteristic data stored in said memory means;

conversion means for converting the image data of m values, corrected by said correction means, into image data of n (<m) values;

transmission means for transmitting the image data of n values converted by said conversion means, to said another apparatus; and recording means which includes a first recording head equipped with plural image recording elements for recording an image, wherein said transmission means transmits characteristic data of the first recording head of said recording means to said another apparatus, and said reception means of said another apparatus receives the image data which have been corrected, in said another apparatus, in a state of m (>2) values, based on said characteristic data transmitted by said transmission means and then converted to a state of n (<m) values.

43. An apparatus according to claim 42, wherein at least one of said first recording head and said second recording head ejects ink by thermal energy.

44. A first image transmitting and receiving apparatus connected by way of a line to a second image transmitting and receiving apparatus, with each of said first transmitting and receiving apparatus and said second transmitting and receiving apparatus comprising:

data output means for releasing image data of m ($>2$) values, for transmission to another apparatus which includes a second recording head equipped with plural image recording elements for recording an image;

reception means for receiving recording density correction data of the second recording head of said another apparatus, to be transmitted from said another apparatus;

memory means for storing said recording density correction data received by said reception means;

density correction means for effecting density correction on the image data of m values released from said data output means, based on the recording density correction data stored in said memory means;

conversion means for converting the image data of m values, subjected to density correction by said density correction means, into image data of n ($<m$) values;

transmission means for transmitting the image data of n values, converted by said conversion means, to the another apparatus; and recording means which includes a first recording head equipped with plural image recording elements for recording an image, wherein said transmission means transmits recording density correction data of the first recording head of said recording means to said another apparatus, and said reception means of said another apparatus receives the image data which have been corrected, in said another apparatus, in a state of m ($>2$) values, based on said recording density correction data transmitted by said transmission means and then converted to a state of n ($<m$) values.

45. An apparatus according to claim 44, wherein at least one of said first recording head and said second recording head ejects ink by thermal energy.

* * * * *

UNITED STATES PATENT AND TRADEMARK OFFICE
CERTIFICATE OF CORRECTION

PATENT NO. : 5,416,596

DATED : May 16, 1995

INVENTOR(S) : AKIO SUZUKI, ET AL.

Page 1 of 2

It is certified that error appears in the above-identified patent and that said Letters Patent is hereby corrected as shown below:

ON TITLE PAGE

In [56] References Cited, under FOREIGN PATENT DOCUMENTS:
"2285771  11/1990  Japan" should read
--2-285771  11/1990  Japan--.

IN THE DRAWINGS

Sheet 16 of 17, FIG. 22:
"SPLITOR" should read --SPLITTER--.

COLUMN 2

Line 1, "drawback," should read --drawbacks,--.

COLUMN 3

Line 24, "same" should read --the same--.

COLUMN 12

Line 48, "with" should read --width--.

COLUMN 13

Line 10, "n" should read --on--.
Line 28, "drak" should read --dark--.

COLUMN 14

Line 38, "an" should read --the--.

UNITED STATES PATENT AND TRADEMARK OFFICE
CERTIFICATE OF CORRECTION

PATENT NO. : 5,416,596
DATED : May 16, 1995
INVENTOR(S) : AKIO SUZUKI, ET AL.

It is certified that error appears in the above-identified patent and that said Letters Patent is hereby corrected as shown below:

COLUMN 18

Line 22, "at" should read --as--.

COLUMN 19

Line 64, "characteristic" should read --characteristic data--.

COLUMN 20

Line 13, "characteristic" should read --characteristic data--.

Signed and Sealed this

Nineteenth Day of September, 1995

*Attest:*

BRUCE LEHMAN

*Attesting Officer*   *Commissioner of Patents and Trademarks*